(12) United States Patent
Nandakumar et al.

(10) Patent No.: US 11,139,960 B2
(45) Date of Patent: *Oct. 5, 2021

(54) FILE REDACTION DATABASE SYSTEM

(71) Applicant: International Business Machines Corporation, Armonk, NY (US)

(72) Inventors: Karthik Nandakumar, Singapore (SG); Nalini K. Ratha, Yorktown Heights, NY (US); Sharathchandra Pankanti, Fairfield County, CT (US)

(73) Assignee: International Business Machines Corporation, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/227,166

(22) Filed: Dec. 20, 2018

(65) Prior Publication Data

US 2020/0204358 A1 Jun. 25, 2020

(51) Int. Cl.
| | |
|---|---|
| H04L 9/08 | (2006.01) |
| H04L 9/32 | (2006.01) |
| H04L 29/06 | (2006.01) |
| H04L 9/06 | (2006.01) |
| G06F 16/176 | (2019.01) |

(Continued)

(52) U.S. Cl.
CPC .......... *H04L 9/0825* (2013.01); *G06F 16/134* (2019.01); *G06F 16/176* (2019.01); *H04L 9/0618* (2013.01); *H04L 9/3231* (2013.01); *H04L 9/3236* (2013.01); *H04L 9/3247* (2013.01); *H04L 63/0428* (2013.01); *H04L 2209/38* (2013.01)

(58) Field of Classification Search
CPC . H04L 9/0825; H04L 9/3236; H04L 63/0428; H04L 9/0618; H04L 9/3231; H04L 9/3247; H04L 2209/38; H04L 9/3239; H04L 63/061; H04L 63/0823; H04L 63/0861; G06F 16/176; G06F 16/134; G06F 21/6209; G06F 21/32
See application file for complete search history.

(56) References Cited

U.S. PATENT DOCUMENTS

| | | | |
|---|---|---|---|
| 7,526,645 B2 * | 4/2009 | Miyazaki | G06F 21/64 713/167 |
| 8,108,906 B2 * | 1/2012 | Miyazaki | G06F 21/64 726/2 |

(Continued)

OTHER PUBLICATIONS

G. Ateniese, D. Chou, B. de Medeiros, and G. Tsudik. "Sanitizable Signatures". In ESORICS'05, (Year: 2005).*

*Primary Examiner* — Darren B Schwartz

(57) ABSTRACT

An example operation may include one or more of determining, by a file redaction device, redacted segments of a source file, receiving, by a signature update device, the redacted source file segments, a stored trapdoor key, and stored auxiliary data segments, determining modified auxiliary data from the redacted source file segments, the trapdoor key and the auxiliary data segments, executing chaincode to obtain a modified auxiliary data signature and identifiers of the redacted source file segments, and storing the modified auxiliary data signature and identifiers of the redacted source file segments to a shared ledger of a blockchain network. Each stored auxiliary data segment including a random string of data corresponding to a segment of the source file.

20 Claims, 22 Drawing Sheets

(51) Int. Cl.
*G06F 16/13* (2019.01)
*G06F 21/62* (2013.01)
*G06F 21/44* (2013.01)
*G06F 21/64* (2013.01)
*G06F 21/32* (2013.01)

(56) References Cited

U.S. PATENT DOCUMENTS

| | | | | |
|---|---|---|---|---|
| 8,433,910 | B2* | 4/2013 | Takenaka | H04L 9/302 |
| | | | | 713/176 |
| 8,719,578 | B2* | 5/2014 | Izu | H04L 9/3236 |
| | | | | 713/176 |
| 9,967,096 | B2 | 5/2018 | Ateniese et al. | |
| 9,992,177 | B2* | 6/2018 | Gajek | H04L 63/0471 |
| 10,860,738 | B2* | 12/2020 | Czerkowicz | G06F 16/137 |
| 2005/0091261 | A1* | 4/2005 | Wu | G06F 21/64 |
| 2007/0106908 | A1* | 5/2007 | Miyazaki | G06F 21/64 |
| | | | | 713/189 |
| 2009/0193256 | A1* | 7/2009 | Takenaka | H04L 9/3249 |
| | | | | 713/176 |
| 2009/0249220 | A1* | 10/2009 | Golle | G06F 21/64 |
| | | | | 715/751 |
| 2010/0005306 | A1* | 1/2010 | Izu | G06F 21/64 |
| | | | | 713/176 |
| 2010/0046749 | A1* | 2/2010 | Hatano | H04L 9/088 |
| | | | | 380/44 |
| 2010/0185867 | A1* | 7/2010 | Izu | H04L 9/3236 |
| | | | | 713/176 |
| 2011/0072278 | A1* | 3/2011 | Izu | G06F 21/64 |
| | | | | 713/193 |
| 2015/0033024 | A1* | 1/2015 | Mashima | H04L 63/123 |
| | | | | 713/176 |
| 2015/0128283 | A1* | 5/2015 | Mashima | G06F 16/2246 |
| | | | | 726/26 |
| 2017/0005804 | A1 | 1/2017 | Zinder | |
| 2017/0033933 | A1* | 2/2017 | Haber | G06F 21/64 |
| 2017/0237569 | A1 | 8/2017 | Vandervort | |
| 2017/0243193 | A1 | 8/2017 | Manian et al. | |
| 2017/0257358 | A1* | 9/2017 | Ebrahimi | H04L 9/3247 |
| 2017/0316497 | A1* | 11/2017 | Song | G06Q 20/4014 |
| 2018/0131706 | A1 | 5/2018 | Anderson et al. | |
| 2019/0013931 | A1* | 1/2019 | Benini | H04L 9/3033 |
| 2019/0074962 | A1* | 3/2019 | Ateniese | H04L 63/061 |
| 2019/0081796 | A1 | 3/2019 | Chow et al. | |
| 2019/0325038 | A1* | 10/2019 | Finlow-Bates | G06F 16/162 |
| 2020/0067697 | A1* | 2/2020 | Puddu | G06F 21/602 |

* cited by examiner

FILE REDACTION DATABASE SYSTEM

TECHNICAL FIELD

This application generally relates to a database storage system, and more particularly, to a file redaction database system.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by centralized control and approval, which makes such a system vulnerable to tampering and unauthorized file modifications. As such, what is needed is a solution to overcome these significant drawbacks.

SUMMARY

One example embodiment provides a system that includes a blockchain network, which includes a shared ledger, a file creation device, and a signature generation device. The file creation device is configured to create a source file. The signature generation device is configured to segment the source file into source file segments, create a number of auxiliary data segments that correspond to source file segments, perform a chameleon hash of the source file segments and the auxiliary data segments, obtain a source file signature from the chameleon hash, perform a cryptographic hash of the auxiliary data segments, obtain an auxiliary data signature from the cryptographic hash, and store the source file and cryptographic signatures to the shared ledger. Each auxiliary data segment includes a random string of data that corresponds to a source file segment.

Another example embodiment provides a method that includes one or more of creating a source file, segmenting the source file into source file segments, creating a number of auxiliary data segments corresponding to source file segments, performing a chameleon hash of the source file segments and the auxiliary data segments, obtaining a source file signature from the chameleon hash, performing a cryptographic hash of the auxiliary data segments, obtaining an auxiliary data signature from the cryptographic hash, and storing the source file and cryptographic signatures to a shared ledger of a blockchain network. Each auxiliary data segment includes a random string of data that is generated based on a corresponding source file segment.

A further example embodiment provides a non-transitory computer readable medium comprising instructions, that when read by a processor, cause the processor to perform one or more of creating a source file, segmenting the source file into source file segments, creating a number of auxiliary data segments corresponding to source file segments, performing a chameleon hash of the source file segments and the auxiliary data segments, obtaining a source file signature from the chameleon hash, performing a cryptographic hash of the auxiliary data segments, obtaining an auxiliary data signature from the cryptographic hash, and storing the source file and cryptographic signatures to a shared ledger of a blockchain network. Each auxiliary data segment includes a random string of data that is generated based on a corresponding source file segment.

One example embodiment provides a system that includes a blockchain network, a file redaction device, and a signature update device. The blockchain network includes a shared ledger. The file redaction device is configured to determine redacted segments of a source file. The signature update device is configured to receive the redacted source file segments, receive a stored trapdoor key and stored auxiliary data segments, determine modified auxiliary data from the redacted source file segments, the trapdoor key and the auxiliary data segments, execute chaincode to obtain a modified auxiliary data signature and identifiers of the redacted source file segments, and store the modified auxiliary data signature and identifiers of the redacted source file segments to the shared ledger. Each auxiliary data segment includes a random string of data that corresponds to a segment of the source file Another example embodiment provides a method that includes one or more of determining, by a file redaction device, redacted segments of a source file, receiving, by a signature update device, the redacted source file segments, a stored trapdoor key, and stored auxiliary data segments, determining modified auxiliary data from the redacted source file segments, the trapdoor key and the auxiliary data segments, executing chaincode to obtain a modified auxiliary data signature and identifiers of the redacted source file segments, and storing the modified auxiliary data signature and identifiers of the redacted source file segments to a shared ledger of a blockchain network. Each stored auxiliary data segment including a random string of data corresponding to a segment of the source file.

A further example embodiment provides a non-transitory computer readable medium comprising instructions, that when read by a processor, cause the processor to perform one or more of determining, by a file redaction device, redacted segments of a source file, receiving, by a signature update device, the redacted source file segments, a stored trapdoor key, and stored auxiliary data segments, determining modified auxiliary data from the redacted source file segments, the trapdoor key and the auxiliary data segments, executing chaincode to obtain a modified auxiliary data signature and identifiers of the redacted source file segments, and storing the modified auxiliary data signature and identifiers of the redacted source file segments to a shared ledger of a blockchain network. Each stored auxiliary data segment including a random string of data corresponding to a segment of the source file.

One example embodiment provides a system that includes a blockchain network, including a shared ledger, and a file verification device. The file verification device is configured to initiate verification of a source file or a redacted source file, execute one of a smart contract or chaincode to verify the chameleon hash signature and the auxiliary data hash signature, and provide a notification whether the verification was successful or unsuccessful to a user who initiates verification. In response to the file verification device initiates verification of the source file, the file verification device is further configured to receive stored source file segments and stored auxiliary data segments, generate a chameleon hash signature from the stored source file segments and the stored auxiliary data segments, and generate an auxiliary data hash signature from the stored auxiliary data segments. In response to the file verification device initiates verification of the redacted source file, the file verification device further is configured to receive stored redacted file segments, stored auxiliary data segments, and stored modified auxiliary data, generate a chameleon hash signature from the stored redacted file segments and stored auxiliary data segments, and generate an auxiliary data hash signature from the stored modified auxiliary data.

Another example embodiment provides a method that includes one or more of initiating, by a file verification device, verification of a source file or a redacted source file, executing one of a smart contract or chaincode to verify the chameleon hash signature and the auxiliary data hash signature, and providing a notification whether the verification was successful or unsuccessful to a user initiating verification. In response to the file verification device initiating verification of the source file, the method further includes the file verification device receiving stored source file segments and stored auxiliary data segments, generating a chameleon hash signature from the stored source file segments and the stored auxiliary data segments, and generating an auxiliary data hash signature from the stored auxiliary data segments. In response to the file verification device initiating verification of the redacted source file, the method further includes the file verification device receiving stored redacted file segments, stored auxiliary data segments, and stored modified auxiliary data, generating a chameleon hash signature from the stored redacted file segments and stored auxiliary data segments, and generating an auxiliary data hash signature from the stored modified auxiliary data.

A further example embodiment provides a non-transitory computer readable medium comprising instructions, that when read by a processor, cause the processor to perform one or more of initiating, by a file verification device, verification of a source file or a redacted source file, executing one of a smart contract or chaincode to verify the chameleon hash signature and the auxiliary data hash signature, and providing a notification whether the verification was successful or unsuccessful to a user initiating verification. In response to the file verification device initiating verification of the source file, the method further includes the file verification device receiving stored source file segments and stored auxiliary data segments, generating a chameleon hash signature from the stored source file segments and the stored auxiliary data segments, and generating an auxiliary data hash signature from the stored auxiliary data segments. In response to the file verification device initiating verification of the redacted source file, the method further includes the file verification device receiving stored redacted file segments, stored auxiliary data segments, and stored modified auxiliary data, generating a chameleon hash signature from the stored redacted file segments and stored auxiliary data segments, and generating an auxiliary data hash signature from the stored modified auxiliary data.

DETAILED DESCRIPTION

Figure 1A:
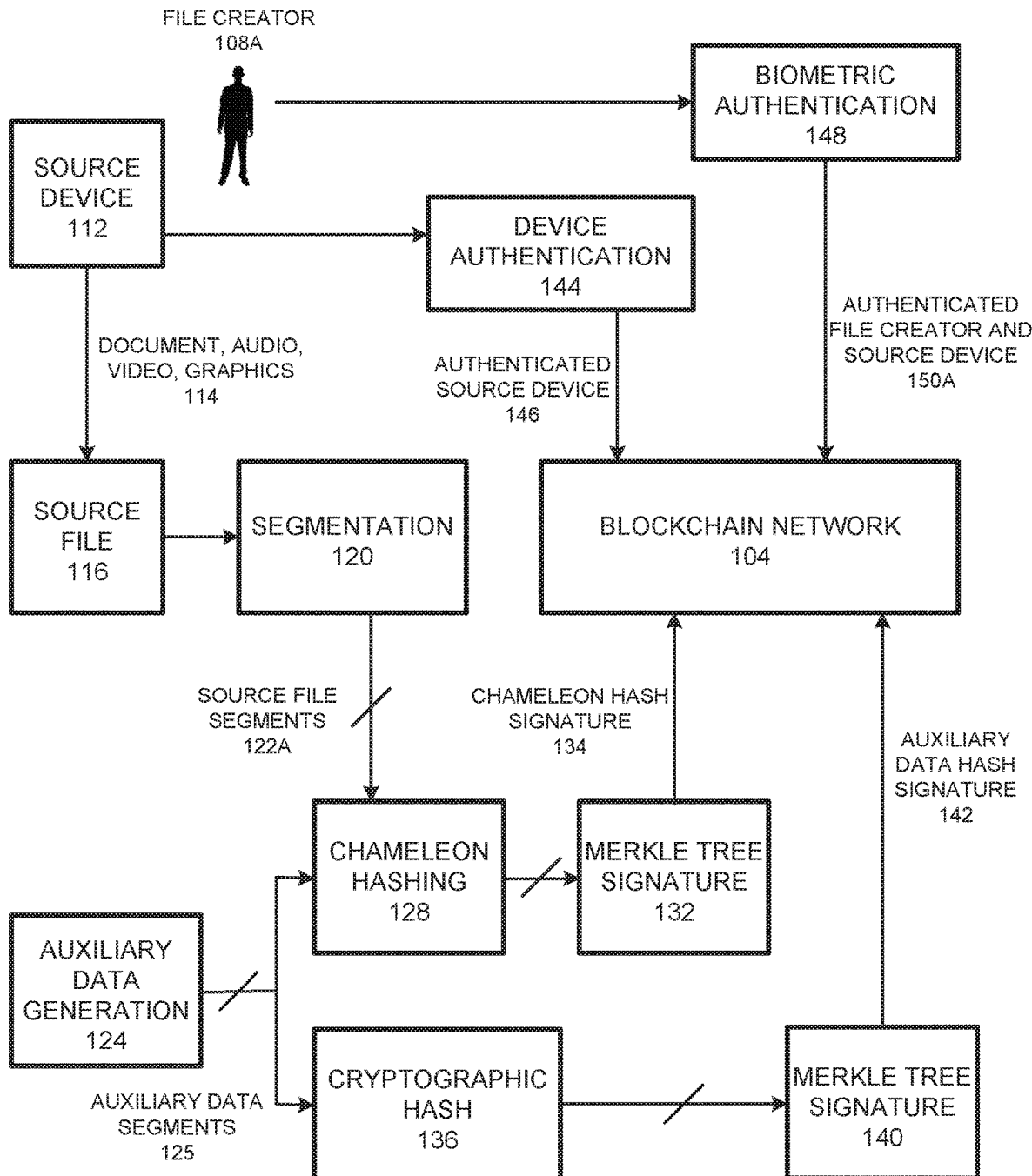
FIG. 1A illustrates a logic network diagram of a system for securely storing source media files to a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a device-based blockchain system.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a new solution where a gap previously existed. Existing blockchain-based solutions for multimedia integrity verification do not allow modification of the content after the initial commitment. The present application describes a novel blockchain-based solution that supports advanced integrity requirements such as authorized multimedia content alteration (e.g., redaction of faces to protect the privacy of individuals) by its creator before the content is distributed, while preventing the end-users from reconstructing the redacted segments based on the published commitment. The proposed solution employs a chameleon hash function to generate the initial commitment, which is stored on the blockchain. The auxiliary data required for the integrity verification step is retained by the content creator and only a signature of this auxiliary data is stored on the blockchain. Any modifications to the multimedia content require only updating the signature of the auxiliary data, which is securely recorded on the blockchain.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the blockchain-based file integrity processes are implemented due to immutability/accountability, smart contracts/chaincodes, privacy/hidden aspects, decentralized/distributed organization, and consensus, —which are inherent and unique to blockchain.

In particular, with respect to immutability/accountability, the present application provides a solution that fundamentally relies on the fact that the commitments (content and auxiliary data signatures, i.e., the root nodes of the two Merkle trees, as well as timestamps, and content owner identity details) published on the blockchain are immutable/not changeable.

With respect to smart contracts/chaincodes, they are used to record/track both changes made to the content and to verify the integrity of the content.

With respect to privacy/hidden aspects, one of the core challenges solved by the present application are ways to make public commitment about a multimedia content/document and making selective redactions to the public commitment such that the actual content itself remains private/hidden during the recited process.

With respect to decentralized and distributed aspects, by using the decentralized/distributed nature of blockchain, the need for a single trusted entity to manage the published commitments is provided, which improves the integrity verification service.

With respect to consensus, distributed consensus ensures that no single entity in the blockchain network can modify the stored commitments on the blockchain in an unauthorized manner.

One of the benefits of the example embodiments is that it improves the functionality of a computing system by not relying on a centralized database. While it is possible to implement this application on a traditional database instead of a blockchain, such a scenario would require a centralized trusted entity who can guarantee the integrity of the commitments stored on the database and perform redaction on behalf of the content owners. In many applications, there is no single entity who can provide such a service and is fully trusted by all the players in the ecosystem.

Through the blockchain system described herein, a computing system can perform functionality without a single point of compromise because of the mechanisms inherent to blockchain. For example, all transactions and transaction results are stored in an immutable shared ledger by each major component that is a blockchain peer. Tampering is readily detectable as a shared ledger would not match other shared ledgers of the blockchain network. Instead of storing a regular cryptographic hash of the content on a database, the proposed application stores a redactable signature. This has two main advantages. Firstly, it becomes possible to make unauthorized modifications to the content without invalidating the stored commitment. Secondly, the stored commitment is no longer susceptible to brute-force hash inversion attacks, especially if the original content has low entropy or randomness.

The example embodiments provide numerous benefits over a traditional database. For example, through the blockchain the embodiments provide new technical means to address issues encountered in storage and verification of redacted files. Meanwhile, a traditional database could not be used to implement the example embodiments because traditional databases utilize centralized storage that may be tampered with and does not rely on all blockchain peers to reach consensus for new transactions. Accordingly, the example embodiments provide for a specific solution to a problem in the arts/field of secure document and file control.

The example embodiments also change how data may be stored within a block structure of the blockchain. For example, data and transactions that will be stored in the blockchain will be signatures (root nodes) of two Merkle trees, which constitute the redactable signatures of the content. Additionally, metadata about the content, including creator ID, device authentication details, timestamp of content creation, logs of authorized modifications, and user authentications may all be stored on the blockchain.

The present application achieves the key functional requirements of (i) guaranteeing content integrity while allowing for declared modifications to the content and (ii) content privacy. A dishonest creator may perform unauthorized (not recorded on the blockchain) modifications to the content after making the initial commitment, without being detected by the recipient. The content recipient cannot learn any information about the original data contained in the redacted segments during signature verification.

While significant advancements have been made in the field of multimedia forensics to detect altered content, existing techniques are mostly passive as they rarely enable the content creator to prove the integrity of the released content. In many application scenarios, the creator has a strong incentive to establish the provenance and integrity of the multimedia data created and released by him. Since blockchain technology provides an immutable distributed database, it is an ideal solution for reliably time-stamping content with its creation time and storing an irrefutable commitment of the content at the time of its creation. However, a blockchain-based approach does not allow modification of the content after the initial commitment. The present application describes a unique blockchain-based solution that supports advanced integrity requirements such as authorized multimedia content alteration (e.g., redaction of faces to protect the privacy of individuals) by its creator before the content is distributed, while preventing the end-users from reconstructing the redacted segments based on the published commitment. The proposed solution employs a chameleon hash function to generate the initial commitment, which is stored on the blockchain. The auxiliary data required for the integrity verification step is retained by the content creator and only a signature of this auxiliary data is stored on the blockchain. Any modifications to the multimedia content require only updating the signature of the auxiliary data, which is securely recorded on the blockchain. Thus, the proposed approach enables verification of integrity of redacted multimedia content without compromising the content privacy requirements.

In today's era of unreliable news, the easy availability of multimedia manipulation tools has made it difficult to trust what we see (image or video) or hear (audio). However, multimedia data (e.g., audio/video recordings) are admissible as evidence in courts and are often portrayed by the media as the ultimate "truth" of what happened. While significant advancements have been made in the field of multimedia forensics to detect altered content, these techniques are mostly passive because the content recipient attempts to verify the integrity of multimedia data without any inputs from the content creator. In many scenarios (e.g., citizen journalism, law enforcement), the content creator does have a strong incentive to establish the provenance and integrity of the multimedia data created and released by him.

Though active content authentication solutions such as watermarking and digital signatures have been proposed, they do not provide the creator of multimedia content with the ability to prove to a future recipient the following claims about the content: (i) ownership, (ii) device used to create the content, (iii) time of creation, and (iv) either the content has not been modified after creation or an immutable log of modifications made to the content after creation. These requirements can be met by enabling the content owner to make an irrefutable commitment about the multimedia content at the time of creation so that a the recipient can verify these details at a later point in time.

Blockchain is a peer-to-peer distributed ledger that immutably records a sequence of transactions without the need for any centralized or trusted entities. While blockchain has already been successfully applied in cryptocurrencies such as Bitcoin, the underlying technology can be used to create a tamper-proof audit trail in many applications. When combined with smart contracts o chaincodes, blockchain is a natural solution for storing the multimedia content creation record and immutably tracking all permissible changes after content creation. Note that commitments on the blockchain can be performed directly by the content creator or through a third-party service provider. While ownership of the content can be established through biometric authentication of the creator, the device itself can be authenticated through its unique fingerprint (e.g., photo response non-uniformity (PRNU) of a camera or microphone imperfections). Solutions are also available for trusted time-stamping of multimedia content using blockchain. Therefore, the present application focuses only the content authentication problem, and specifically on challenges in proving authenticity after revisions are made to the media after its creation.

The main limitation of blockchain-based approach is that the content creator is required to commit to a tamper-proof signature of the content at the time of its creation. Any further modifications to the content will surely invalidate this signature. In real-world use cases, the creator may have valid reasons to alter the content before distribution. For example, a bodycam video captured by law enforcement is used to prove innocence of the officer and a true description of the event. However, the privacy of the subjects in the video is important. Hence, the contents are sometimes redacted before they are released to the public. One would expect that the edited released video continues to faithfully depict the true event while protecting personally sensitive information of its subjects. Similar requirements are also felt in legal documents and scene-of-crime pictures. One possible solution is to employ redactable or sanitizable signature schemes to generate the initial commitment. The key limitation of such schemes is the need for a trusted third-party 'censor' or 'sanitizer', who performs the redaction on behalf of the content creator. Secondly, this approach also assumes a perfect communication protocol between the creator and the censor. Sanitizable signature schemes rely on this feature to prevent the creator from making undetectable modifications. Moreover, since the redacted segments may have a low entropy or randomness, the published commitment should not leak any information that enables the receiver to unwrap the redacted segments.

The present application describes a novel blockchain-based solution for multimedia integrity verification that overcomes all of the above-mentioned limitations. The primary contribution of this work is a sanitizable signature method that utilizes the properties of blockchain, chameleon hash functions, and Merkle trees to efficiently sign the given multimedia content, transparently update the signature upon content modification, and verify the integrity of the released content. We also present a theoretical analysis of the security properties and computational complexity of the proposed solution.

FIG. 1A illustrates a logic network diagram of a system 100 for securely storing source media files to a blockchain, according to example embodiments. Referring to FIG. 1A, the system 100 includes a file creator 108, who is a user who creates or captures a source file 116 with a source device 112. The source device 112 may be a computer of any type including a mobile computer, a desktop computer, a server, a smartphone, or a wearable computer. Such a computer 112 may or may not include a camera, a microphone, speakers, or a display. The source device 112 may additionally or alternately include a picture camera, a video camera, or an audio recorder. The source file 116 may contain any combination of text (as a document), video, audio, or graphics 114. One or more of text, video, audio, or graphics 114 may not be present in the source file 116. The source device 112 can make use of device authentication 144 and the authenticated source device 146 can be stored on the blockchain network 104.

The present application makes use of biometric authentication 148 in order to ensure provenance of both the file creator 108A and the source device 112 used to create or capture the source file 116. Provenance, in the context of the present application, is the history of ownership back to the origin of the source file 116. Biometric authentication 148 is used to create a blockchain transaction that stores an authenticated file creator and source device signature 150A to a shared ledger of a blockchain network 104. The blockchain network 104 may be either a public or a permissioned blockchain network 104. The only difference lies in how the transaction is approved by the relevant stakeholders. In a permissioned blockchain this can be handled via smart contracts and endorsement policies. In a public blockchain, multi-signatures can be employed to obtain "pre-approval" before the miners commit the transaction to the blockchain.

Once the source file 116 has been created or captured by the file creator 108A, the source file 116 is segmented by a segmentation function 120 into a plurality of source file segments 122A. Various forms of existing software and software applications may be used to segment the source file 116. In one embodiment, the source file segments 122A are of equal size. In another embodiment, some source file segments 122A are of a first size while other source file segments 122A are of a different second size. In another embodiment, source file segments 122A are of a variable size. The segmentation function 120 produces N source file segments 122A, where N is the number of source file segments 122A.

Following segmentation 120, an auxiliary data generation function 124 generates N auxiliary data segments 125. Therefore, the number N of auxiliary data segments 125 is equal to the number N of source file segments 122A. Auxiliary data is a random string of data that is generated independent of the source file 116. This random string of data is then segmented into the auxiliary data segments 125. At this point, there are N source file segments 122A and N auxiliary data segments 125. Alternately, one may generate N random (shorter) strings individually.

The present application utilizes both a chameleon hashing function 128 and a cryptographic hash function 136 to process the source file segments 122A and the auxiliary data segments 125. Chameleon hash functions are randomized collision-resistant hash functions with the additional property that given a trapdoor, one can efficiently generate collisions. More specifically, each function in the family is associated with a pair of public and private (trapdoor) keys with the following properties (i) anyone who knows the public key can compute the associated hash function, (ii) for those who do not know the trapdoor the function is collision resistant in the usual sense, and (iii) the holder of the trapdoor information can easily find collisions for every input. A cryptographic hash function is a mathematical algorithm that maps data of arbitrary size to a bit string of a fixed size (a hash) and is designed to be a one-way function, that is, a function which is infeasible to invert. The only way to recreate the input data from an ideal cryptographic hash function's output is to attempt a brute-force search of possible inputs to see if they produce a match, or use a rainbow table of matched hashes.

Figure 1B:
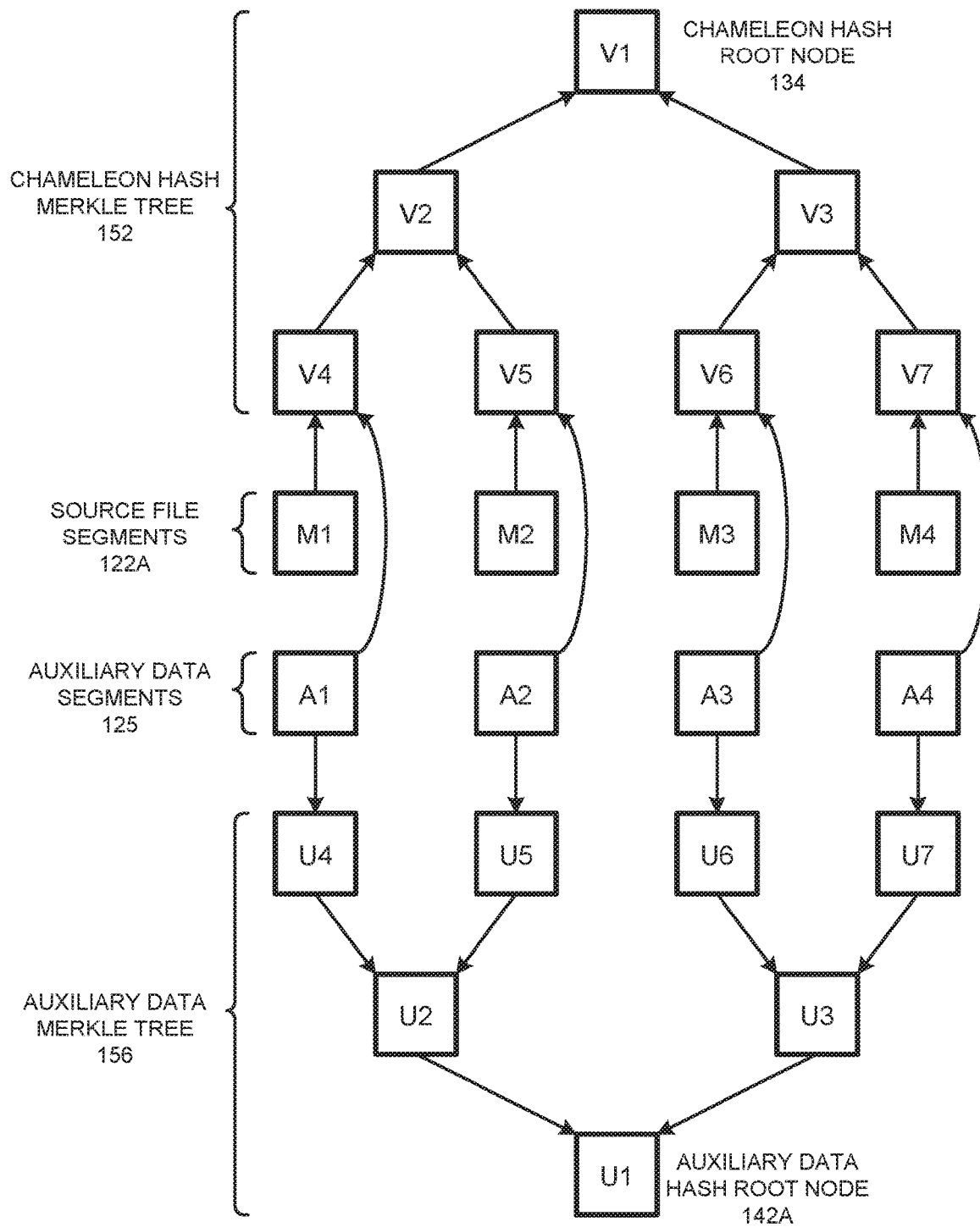
FIG. 1B illustrates sanitizable signature generation for a file in a blockchain, according to example embodiments.

The chameleon hashing function 128 converts source file segments 122A (nodes M1, M2, M3, and M4 of FIG. 1B) and auxiliary data segments 125 (nodes A1, A2, A3, and A4 of FIG. 1B) as inputs into chameleon hash leaf nodes (nodes V4, V5, V6, and V7 of FIG. 1B).

A chameleon hash is defined by the triplet: (Gen; CH; $CH^{-1}$), where Gen is a key generation algorithm that generates a key pair (HK; TD), with HK being the hashing (public) key and TD being the trapdoor (secret) key 168 that is used for finding collisions. The public key HK defines a chameleon hash function $CH_{HK}(,)$, which on input a message m and a random string a (previously referred to as auxiliary data), generates a hash value $CH_{HK}(m, a)$ that satisfies the following properties.

Collision Resistance: Given only $CH_{HK}(,)$, there is no efficient algorithm to find pairs (m1, a1) and (m2, a2) where (m1, a1) is not equal to (m2, a2) such that $CH_{HK}(m1, a1)=CH_{HK}(m2, a2)$, except with negligible probability.

Trapdoor collisions: There is an efficient algorithm ($CH^{-1}$) that on input the secret key TD, any pair (m1, a1) and any additional message m2, outputs a value a2 such that $CH_{HK}(m1, a1)=CH_{HK}(m2, a2)$.

Uniformity: From seeing $CH_{HK}(m, a)$, where a is chosen uniformly at random, nothing is learned about the message m.

The cryptographic hash function 136 converts auxiliary data segments 125 (nodes A1, A2, A3, and A4 of FIG. 1B) into cryptographic hash leaf nodes (nodes U4, U5, U6, and U7 of FIG. 1B).

The Merkle Tree signature function 132 receives the chameleon hash leaf nodes (nodes V4, V5, V6, and V7 of FIG. 1B) and generates leaf nodes V2 and V3 and root node V1 as hashes. The Merkle Tree signature function 140 receives the cryptographic hash leaf nodes (nodes U4, U5, U6, and U7 of FIG. 1B) and generates leaf nodes U2 and U3 and root node U1 as hashes. Root node V1 is a chameleon hash signature 134 and root node U1 is an auxiliary data hash signature 142. Both signatures 134, 140 are stored to the shared ledger of blockchain network 104 through blockchain transactions. At this point, the signatures corresponding to the source file 116 and authentication results for the file creator 108A and source device 112 are stored to the immutable shared ledger.

System 100 is a sanitizable signature system that allows a file creator 108A to sign the file or multimedia content at the time of its creation and record this initial signature on a blockchain. The blockchain should maintain an immutable log of the segments that were modified. At any given point in time (after content creation), a recipient who receives the content from the file creator 108A should be able to verify the integrity of the received content, i.e., identify which segments have been modified and ensure that the remaining segments have not been altered by the file creator 108A.

FIG. 1B illustrates sanitizable signature generation 150 for a file in a blockchain, according to example embodiments. Referring to FIG. 1B, the signatures 150 are based on a source file M. The source file M is divided into source file segments 122A, identified as source file segments M1, M2, M3, and M4. There may be any number of source file segments 122A in a source file 116, although four such segments 122A are shown in FIG. 1B for simplicity.

Associated with each of the source file segments 122A is an auxiliary data segment 125, identified as auxiliary data segments A1, A2, A3, and A4. A chameleon hash Merkle tree 152 is created from the source file segments 122A and the auxiliary data segments 125. In a binary Merkle tree, every leaf node is labeled with a cryptographic hash of the input data blocks and every non-leaf node is labelled with the cryptographic hash of the labels of its two child nodes. In the present application, the input data blocks are the chameleon hashes of the individual segments.

Leaf node V4 is created from source file segment M1 and auxiliary data segment A1. Leaf node V5 is created from source file segment M2 and auxiliary data segment A2. Leaf node V6 is created from source file segment M3 and auxiliary data segment A3. Leaf node V7 is created from source file segment M4 and auxiliary data segment A4. Leaf node V2 is created from hashes of leaf nodes V4 and V5. Leaf node V3 is created from hashes of leaf nodes V6 and V7. Finally, a root node V1 is created from hashes of leaf nodes V2 and V3. The root node V1 is chameleon hash root node 134, which is the signature that is stored to the shared ledger of the blockchain network 104 for the source file.

An auxiliary data Merkle tree 156 is created from the auxiliary data segments 125. Leaf node U4 is created from auxiliary data segment A1. Leaf node U5 is created from auxiliary data segment A2. Leaf node U6 is created from auxiliary data segment A3. Leaf node U7 is created from auxiliary data segment A4. Leaf node U2 is created from hashes of leaf nodes U4 and U5. Leaf node U3 is created from hashes of leaf nodes U6 and U7. Finally, root node U1 is created from hashes of leaf nodes U2 and U3. The root node U1 is auxiliary data root node 142A, which is the signature that is stored to the shared ledger of the blockchain network 104 for the auxiliary data file. Both the content (i.e. corresponding to the source file 116) and auxiliary data signatures are broadcast to the blockchain nodes, which verify both the signatures before recording (U1, V1) on the shared ledger, along with metadata about the content.

Figure 1C:
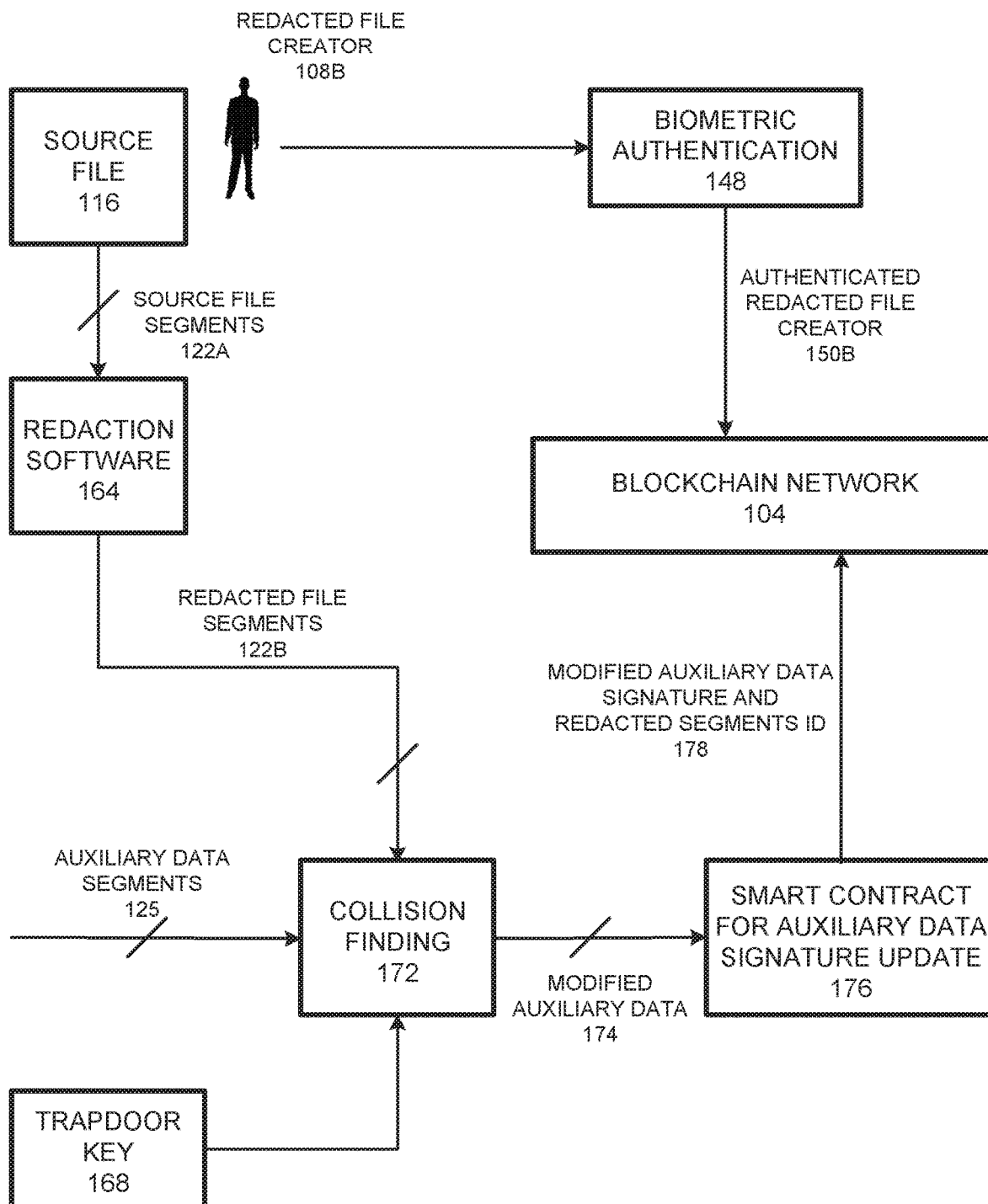
FIG. 1C illustrates a logic network diagram of a system for securely redacting source media files to a blockchain, according to example embodiments.

FIG. 1C illustrates a logic network diagram of a system 160 for securely redacting source media files to a blockchain, according to example embodiments. Referring to FIG. 1C, the system 160 includes a redacted file creator 108B, who is a user who redacts or otherwise modifies the source file 116. In one embodiment, the redacted file creator 108B is a different individual than the file creator 108A. In another embodiment, the redacted file creator 108B is a same individual as the file creator 108A.

The present application makes use of biometric authentication 148 in order to ensure provenance of the redacted file creator 108B. Provenance, in the context of the present application, is the history of ownership back to the origin of the source file 116. Biometric authentication 148 is used to create a blockchain transaction that stores an authenticated redacted file creator signature 150B to the shared ledger of the blockchain network 104. Once authenticated, the redacted file creator 108B redacts/modifies a subset of segments in the content, and updates the initial signature on the blockchain. One critical requirement is content privacy, which implies that an adversary having access to the redacted content and logs available on the blockchain should not be able to reconstruct the original data that was redacted by the redacted file creator 108B.

After the source file 116 has been created or captured by the file creator 108A, the redacted file creator 108B utilizes redaction software 164 to convert one or more source file segments 122B into redacted file segments 122B.

A collision finding function 172 uses the trapdoor key 168 to convert the redacted file segments 122B and auxiliary data segments 125 into modified auxiliary data 174. Finally, a smart contract or chaincode for auxiliary data signature update 176 converts the modified auxiliary data 174 into a modified auxiliary data signature and redacted segments identifiers (IDs) 178. The modified auxiliary data signature and redacted segments identifiers (IDs) 178 is included in a blockchain transaction, which following conventional transaction endorsement is committed to the shared ledger. At this point, the blockchain includes authentications for the file creator 108A, source device 112, and redacted file creator 108B as well as the (original) chameleon hash signature 134, auxiliary data hash signature 142, the modified auxiliary data signature 178, and redacted segments IDs 178.

Figure 1D:
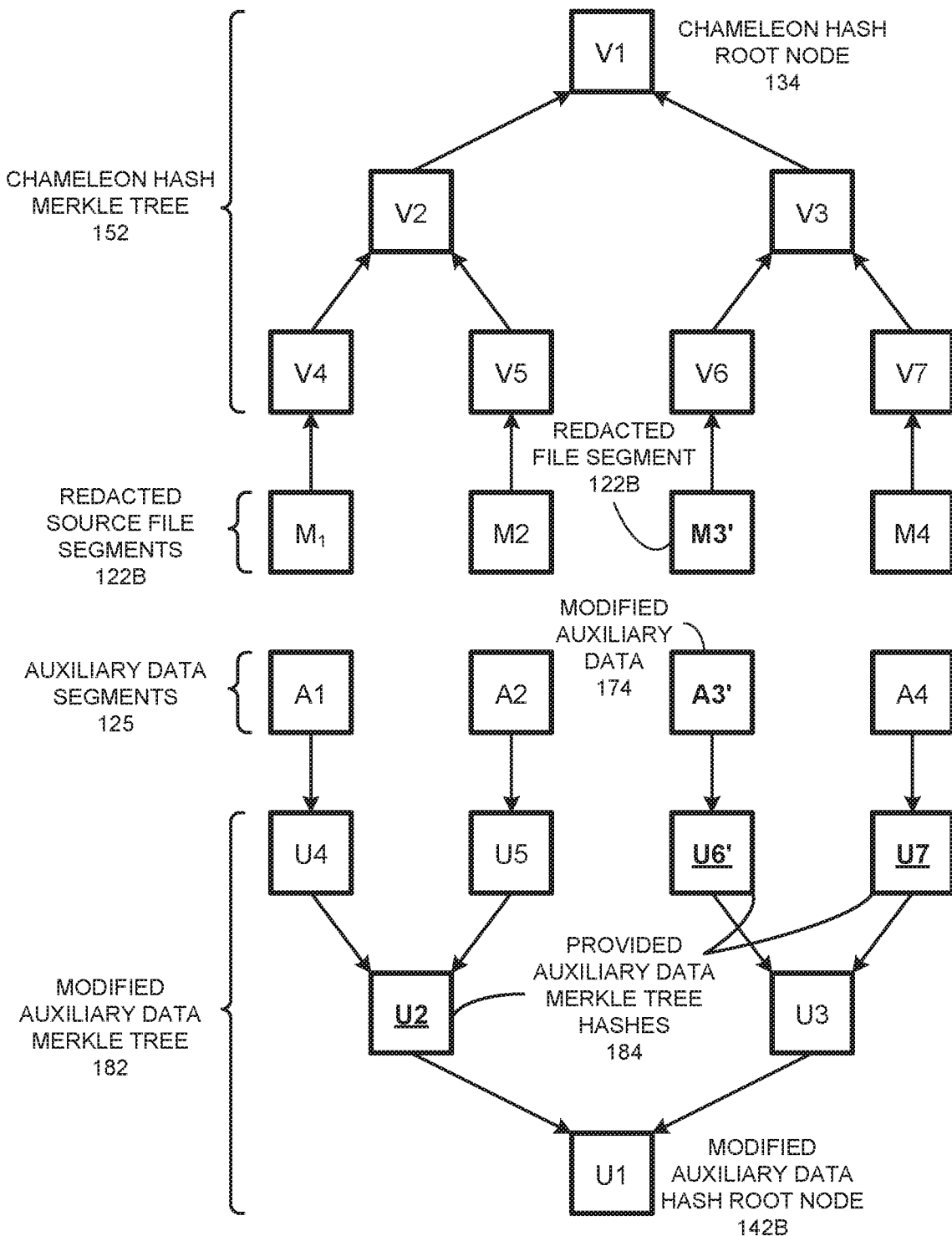
FIG. 1D illustrates sanitizable signature redaction for a file in a blockchain, according to example embodiments.

FIG. 1D illustrates sanitizable signature redaction 180 for a file in a blockchain, according to example embodiments.

Referring to FIG. 1D, the signatures 180 are based on a redacted source file M. The source file M is divided into redacted source file segments 122B, identified as redacted source file segments M1, M2, M3', and M4. Redacted source file segment M3' represents a redacted source file segment. There may be any number of redacted source file segments 122B in a redacted source file, although four such segments 122B are shown in FIG. 1D for simplicity.

Associated with each of the redacted source file segments 122B is auxiliary data segments 125, identified as auxiliary data segments A1, A2, A3', and A4. Auxiliary data segment A3' is modified auxiliary data 174. In the case of redaction, a new chameleon hash Merkle tree 152 and chameleon hash root node 134 are not created; all that is needed is a modified auxiliary data Merkle tree 182 and a modified auxiliary data hash root node 142B.

The modified auxiliary data Merkle tree 182 is created from the auxiliary data segments 125. And the modified auxiliary data 174. Leaf node U4 is created from auxiliary data segment A1. Leaf node U5 is created from auxiliary data segment A2. Leaf node U6' is created from modified auxiliary data segment A3'. Leaf node U7 is created from auxiliary data segment A4. Leaf node U2 is created from leaf nodes U4 and U5. Leaf node U3 is created from leaf nodes U6' and U7. Finally, root node U1 is created from leaf nodes U2 and U3. The root node U1 is a modified auxiliary hash data root node 142B, which is the signature that is stored to the shared ledger of the blockchain network 104 for the redacted data. Modified auxiliary hash data root node 142B may be created from leaf nodes U2, U6', and U7 184, which are represented in FIG. 1D as underlines to denote their special use when constructing root node U1.

Figure 1E:
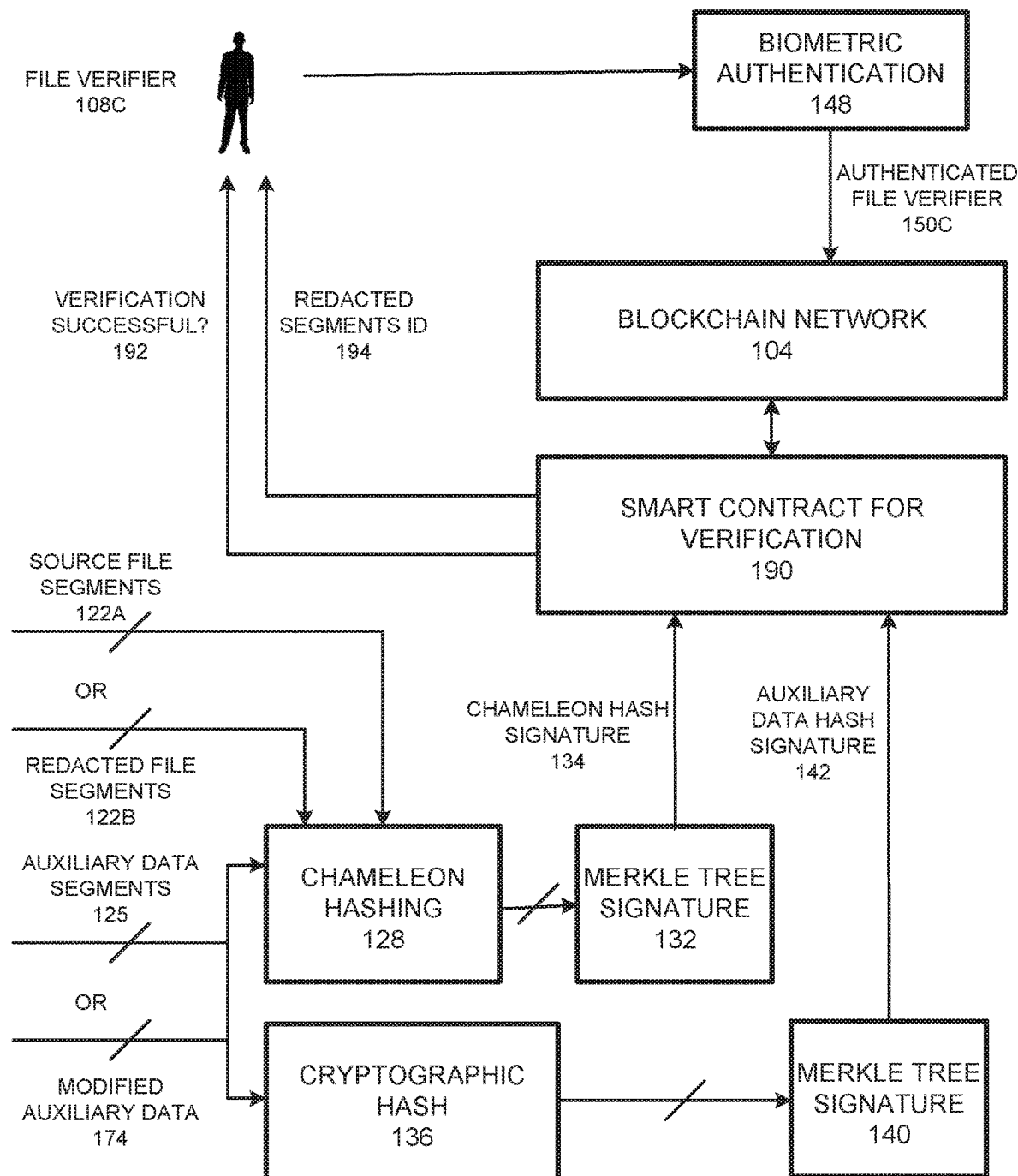
FIG. 1E illustrates a logic network diagram of a system for securely verifying source media files from a blockchain, according to example embodiments

FIG. 1E illustrates a logic network diagram of a system 185 for securely verifying source media files from a blockchain, according to example embodiments. Referring to FIG. 1E, the system 185 includes a file verifier 108C, who is a user who verifies either the source file 116 or the redacted source file. In one embodiment, the file verifier 108C is a different individual than the file creator 108A or redacted file creator 108B. In another embodiment, file verifier 108C is a same individual as one or both of the file creator 108A or the redacted file creator 108B.

The present application makes use of biometric authentication 148 in order to ensure provenance of principally the file creator 108A, and optionally the file verifier 108C to track the recipients of the file. It is important for the file verifier 108C to verify the identity of the sender (i.e. a request for biometric identification of the file creator 108A) to ensure the file was indeed created by the sender. Biometric authentication 148 is used to create a blockchain transaction that stores an authenticated file verifier signature 150C to the shared ledger of the blockchain network 104.

Depending on whether the source file 116 or redacted source file is being verified, the input to the chameleon hash function 128 may differ. If the source file 116 is being verified, the inputs to the chameleon hashing function 128 are the source file segments 122A and the auxiliary data segments 125. If the redacted source file is being verified, the inputs to the chameleon hashing function 128 are the redacted file segments 122B and the modified auxiliary data 174. Similarly, if the source file 116 is being verified, the input to the cryptographic hashing function 136 is the auxiliary data segments 125. If the redacted source file is being verified, the input to the cryptographic hashing function 136 is the modified auxiliary data 174.

The Merkle tree signature function 132 produces a chameleon hash signature 132 to a smart contract for verification 190, and the Merkle tree signature function 140 produces an auxiliary data hash signature 142 to the smart contract for verification 190. The smart contract for verification, after receiving the chameleon hash signature 134 and the auxiliary data hash signature 142, retrieves the stored signatures from the shared ledger and compares the newly calculated chameleon hash signature 134 and the auxiliary data hash signature 142 to the stored signatures.

If the signatures match, then the integrity of the source file 116 or redacted source file has been verified, and the smart contract for verification 190 provides a verification successful notification 192 and an identifier for the redacted segments 194 (if a redacted file is being verified). If the signatures do not match, this may be an indication of tampering or other form of fraud detection and typically an appropriate notification would be provided to the file verifier 108C and/or a system administrator.

Figure 2A:
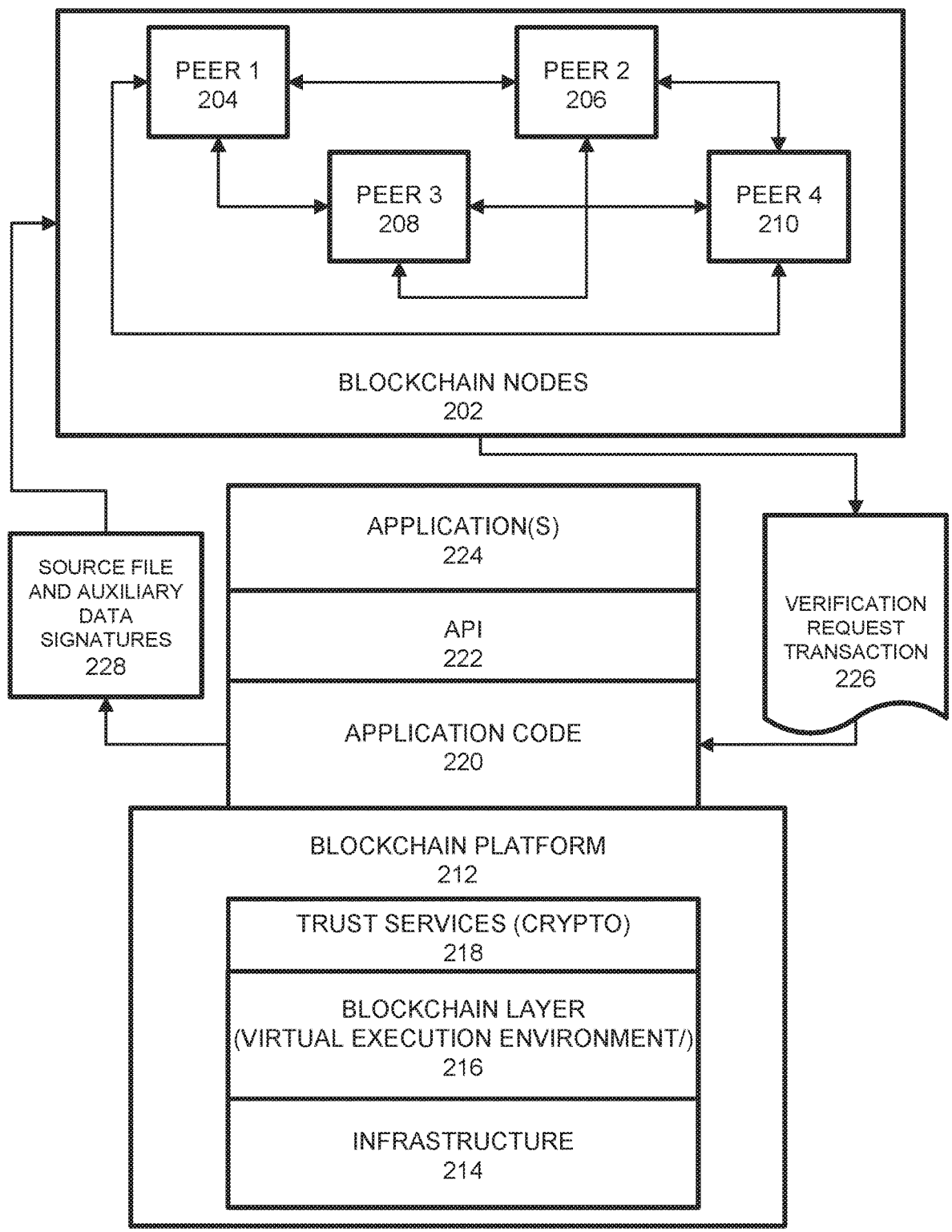
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include various verification request transactions. Verification request transactions 226 may be processed by one or more processing entities (e.g., virtual machines) included in the blockchain layer 216. The result 228 may include a source file and data signatures. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a blockchain platform 212 may receive a blockchain transaction 226 to verify the integrity of a file stored on the blockchain. One function may be to request source file and auxiliary data signatures 228, which may be provided to one or more of the nodes 204-210.

Figure 2B:
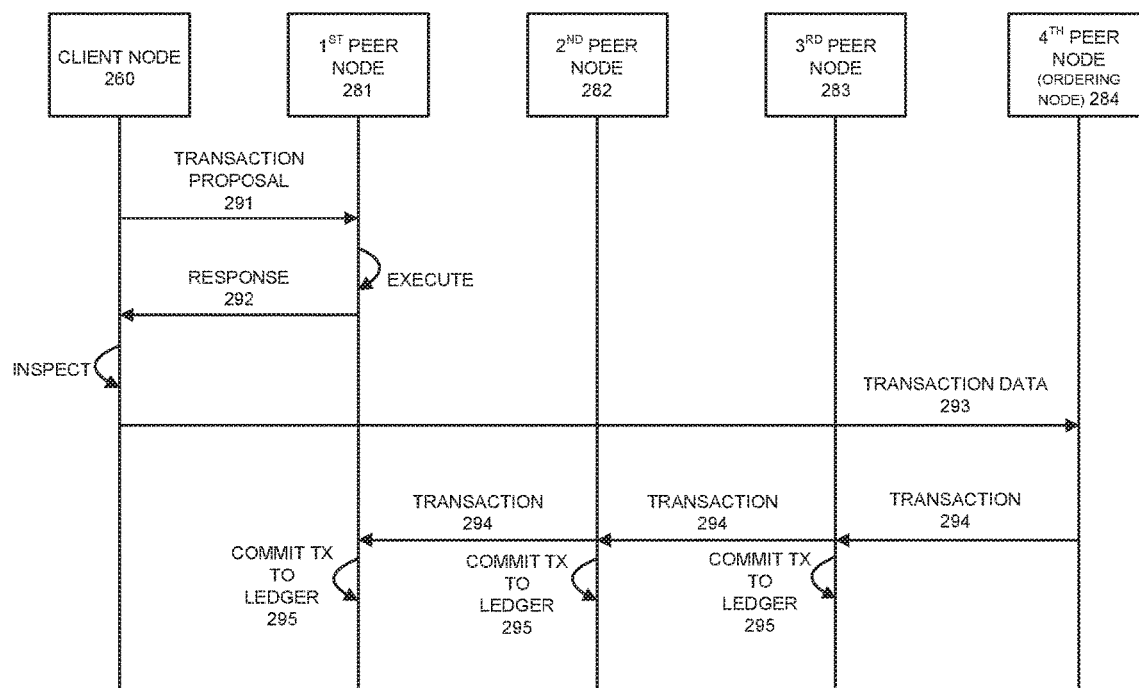
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
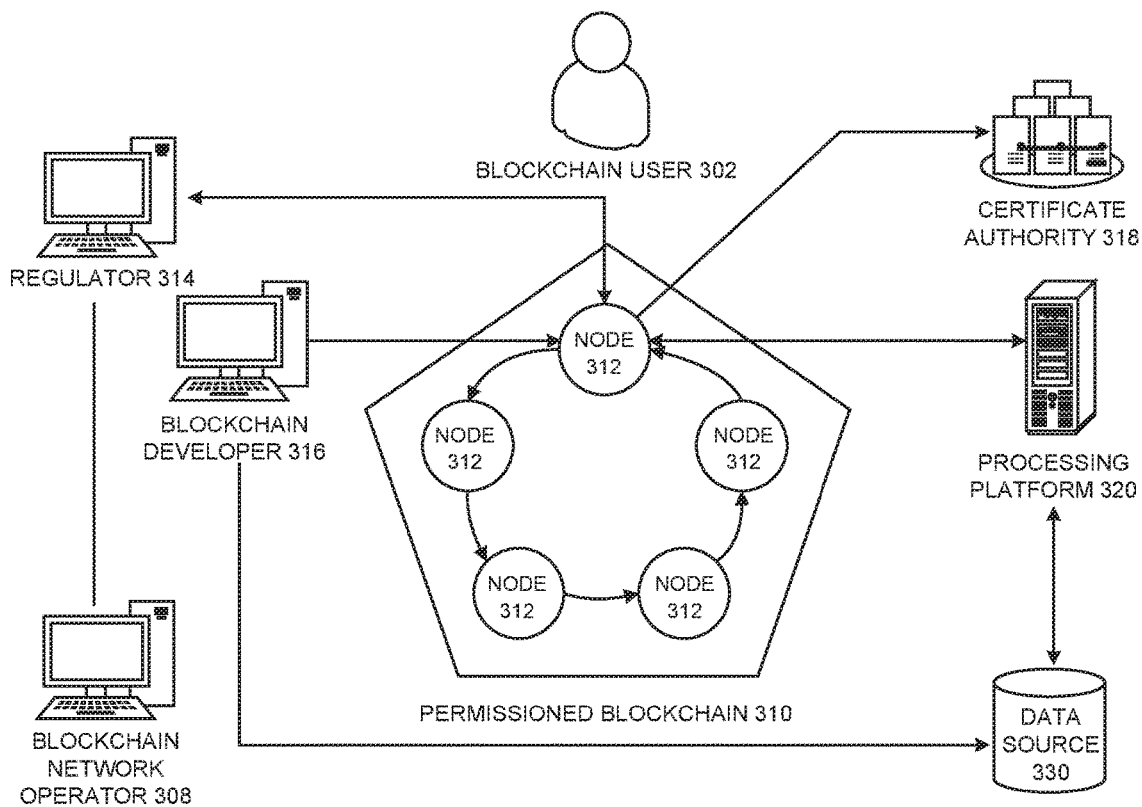
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 314 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
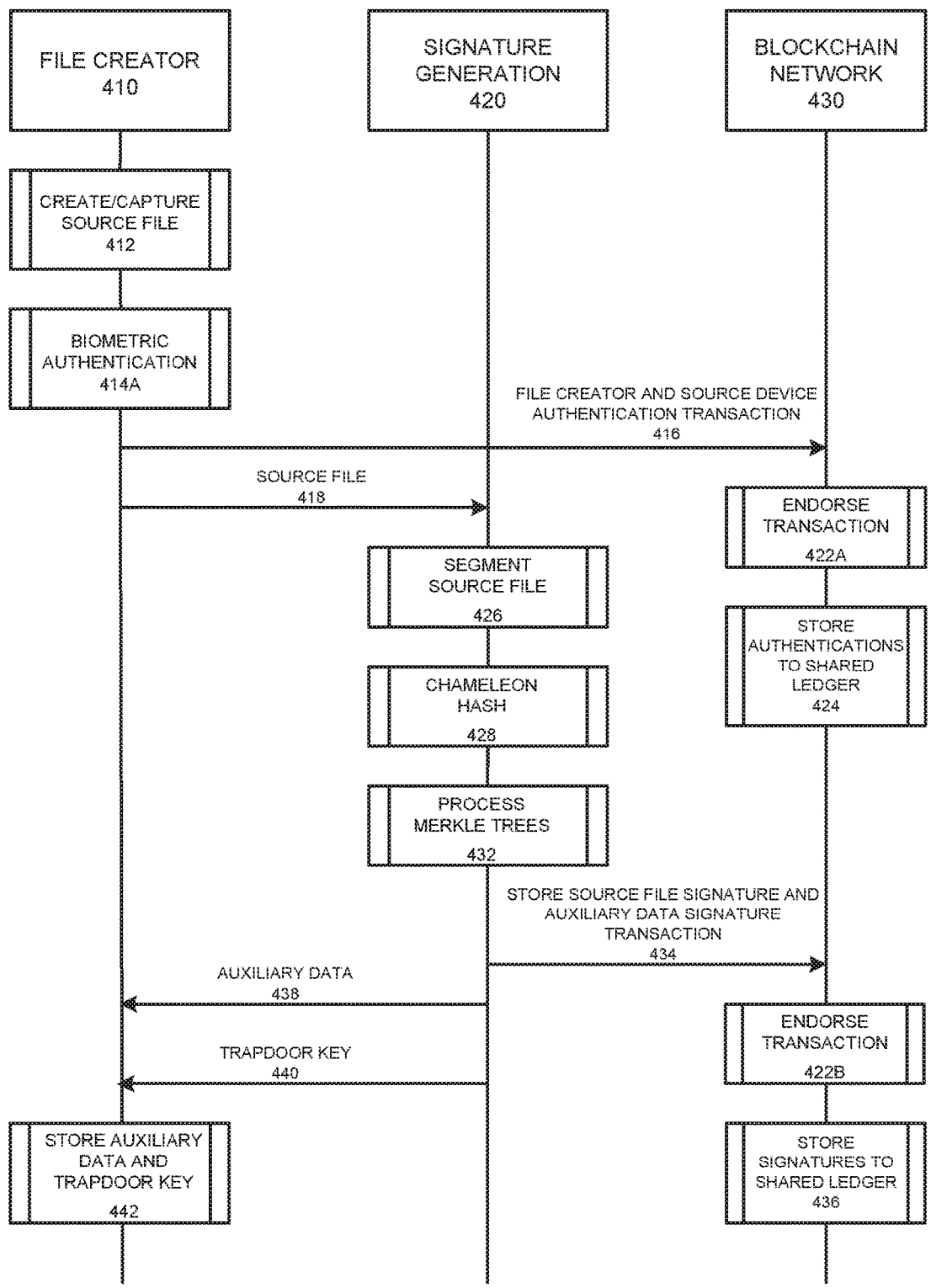
FIG. 4A illustrates a system messaging diagram for performing source file signature generation, according to example embodiments.

FIG. 4A illustrates a system messaging diagram for performing source file signature generation 400, according to example embodiments. Referring to FIG. 4A, the system messaging diagram 400 includes a file creator 410, a signature generation function 420, and a blockchain network 430. The file creator 410 has responsibility for creating or capturing a source file 116, as explained with reference to FIGS. 1A and 1B.

The file creator 410 creates or captures a source file 412 with a source device 112. The file creator 410 then biometrically authenticates 414A his/her identity and the identity of the source device 112, and submits a file creator and source device authentication transaction 416 to the blockchain network 430. In response, the blockchain network 430 endorses the transaction 422A and stores the authentications to the shared ledger 424 of the blockchain network 430.

The file creator 410 next submits the source file 418 to the signature generation function 420. The signature generation function 420 in response segments the source file 426 as previously described with reference to FIGS. 1A and 1B, and performs a chameleon hash 428 and cryptographic hash on the source file segments and auxiliary data segments, and processes Merkle trees 432. Processing the Merkle trees 432 produces a source file signature and an auxiliary data signature, which are included as a blockchain transaction 434 to the blockchain network 430. In response, the blockchain network 430 endorses the transaction 422B and stores both signatures to the shared ledger 436 of the blockchain network 430.

The signature generation function 420 then transfers the auxiliary data 438 and a trapdoor key (used for the chameleon hash 428) back to the file creator 410, who stores both 442. At this point, both the source file and auxiliary data signatures as well as file creator and source device authentications are stored to a shared ledger of the blockchain network 430, and the file creator 410 stores the original source file, auxiliary data 438, and the trapdoor key 440.

Figure 4B:
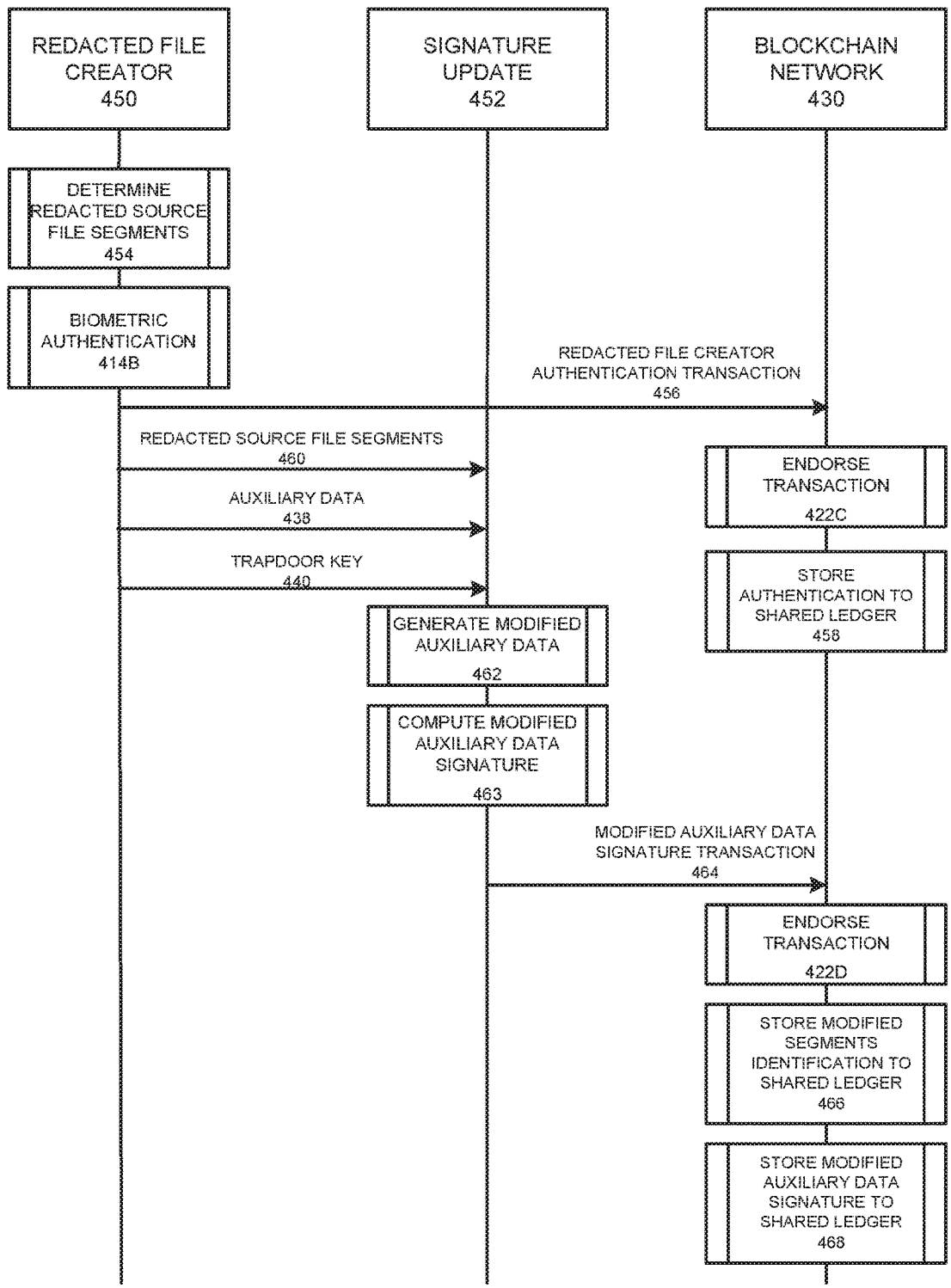
FIG. 4B illustrates a system messaging diagram for performing source file signature redaction, according to example embodiments.

FIG. 4B illustrates a system messaging diagram for performing source file signature redaction 445, according to example embodiments. Referring to FIG. 4B, the system messaging diagram 445 includes a redacted file creator 450, a signature update function 452, and a blockchain network 430.

The redacted file creator 450 determines redacted source file segments 454 by redacting or modifying the source file. The redacted file creator 450 then biometrically authenticates 414B his/her identity and submits a redacted file creator authentication transaction 456 to the blockchain network 430. In response, the blockchain network 430 endorses the transaction 422C and stores the authentications to the shared ledger 458 of the blockchain network 430.

The redacted file creator 450 next submits redacted source file segments 460 to the signature update function 452, along with the stored auxiliary data 438 and the trapdoor key 440. The signature update function 452 in response generates modified auxiliary data 462 as previously described with reference to FIGS. 1C and 1D. The signature update function 452 produces modified auxiliary data 462, and computes a modified auxiliary data signature 463, and provides a modified auxiliary data signature blockchain transaction 464 to the blockchain network 430. In response, the blockchain network 430 endorses the transaction 422D and stores modified segments identification 466 and a modified auxiliary data signature 468 to the shared ledger of the blockchain network 430.

Figure 4C:
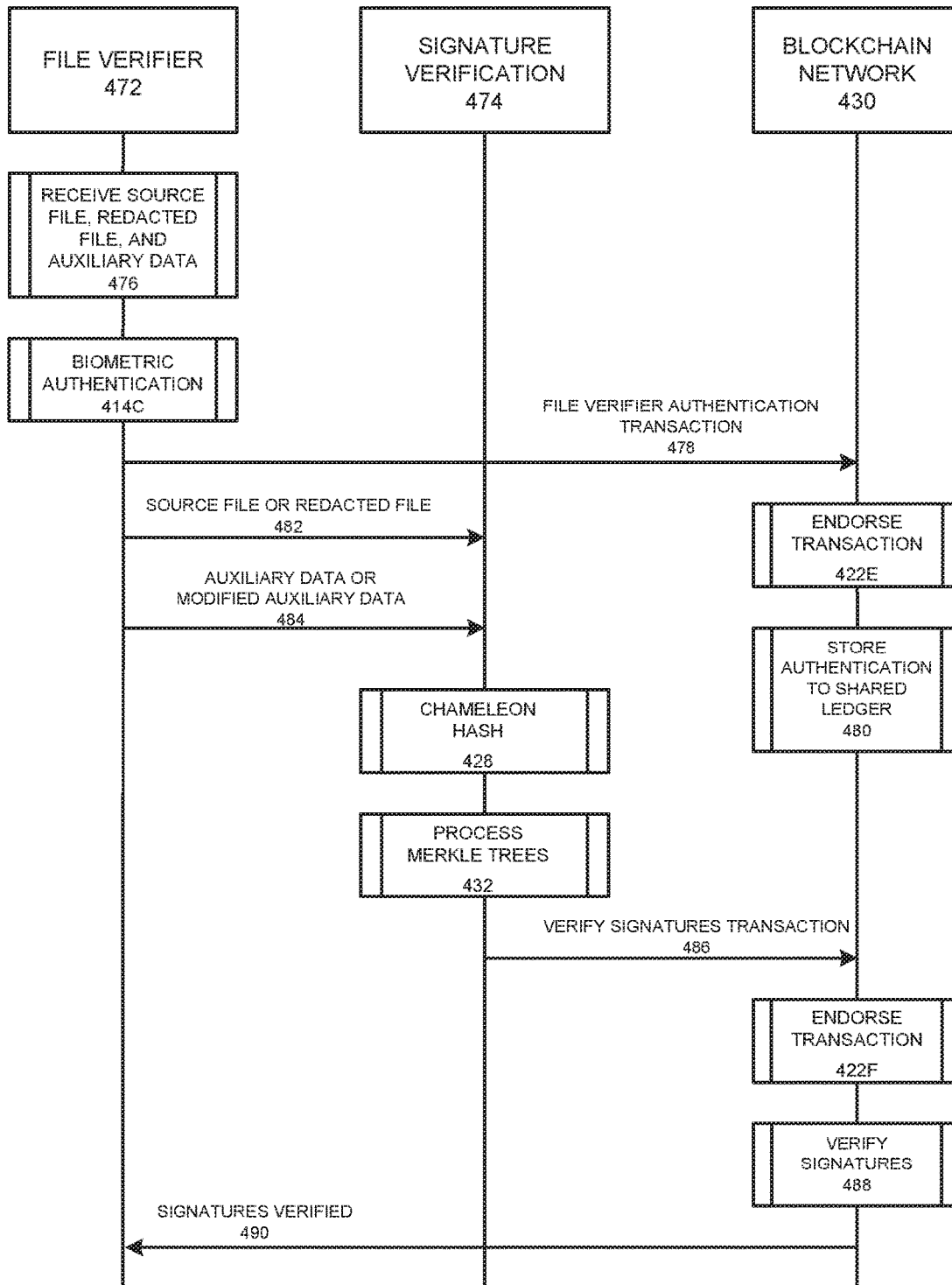
FIG. 4C illustrates a system messaging diagram for performing signature verification, according to example embodiments.

FIG. 4C illustrates a system messaging diagram for performing signature verification 470, according to example embodiments. Referring to FIG. 4C, the system messaging diagram 470 includes a file verifier 472, a signature verification function 474, and a blockchain network 430.

The file verifier 472 verifies the integrity of a source file signature or a redacted file signature previously stored to the blockchain network 430. The file verifier 472 receives source file, redacted file, and auxiliary file 476. The file verifier 472 biometrically authenticates 414C his/her identity, and submits a file verifier authentication transaction 478 to the blockchain network 430. In response, the blockchain network 430 endorses the transaction 422E and stores the authentications to the shared ledger 480 of the blockchain network 430.

The file verifier 472 next submits the source file or redacted file segments 482 and auxiliary data or modified auxiliary data 484 to the signature verification function 474. The signature verification function 474 in response performs a chameleon hash 428 on the source file segments or redacted file segments 482 and auxiliary data or modified auxiliary data 484, performs a cryptographic hash on the auxiliary data or modified auxiliary data 484, and processes Merkle trees 432. Processing the Merkle trees 432 produces a source file signature and an auxiliary data signature, which are included in a verify signatures 488 blockchain transaction 486 to the blockchain network 430. In response, the blockchain network 430 endorses the transaction 422F and a smart contract or chaincode of the blockchain network 430 verifies the signatures in the transaction 486 with the stored signatures on the blockchain.

If the signatures match, the blockchain network 430 provides a signatures verified notification 490 to the file verifier 472.

Figure 5A:
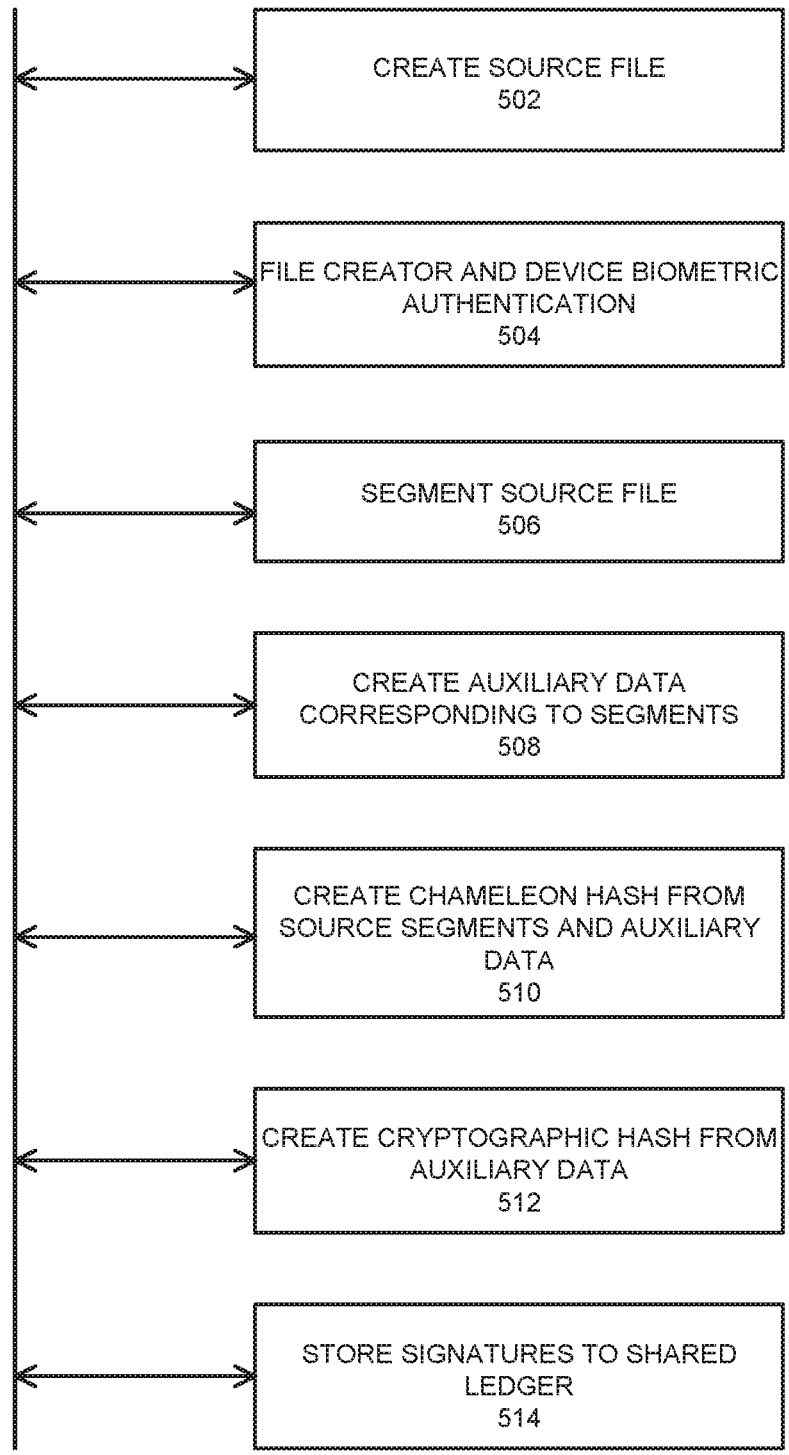
FIG. 5A illustrates a flow diagram of an example method of creating source file signatures in a blockchain, according to example embodiments.

FIG. 5A illustrates a flow diagram 500 of an example method of creating source file signatures in a blockchain, according to example embodiments. Referring to FIG. 5A, the method 500 may include one or more of the following steps.

At block 502, a file creator 410 creates a source file with a source device. The source file may include text, video, audio, and/or graphics.

At block 504, the file creator 410 and source device are biometrically authenticated, and the authentications are stored to a blockchain.

At block 506, the source file is segmented into any number of segments.

At block 508, auxiliary data is created that corresponds to the source file segments.

At block 510, a chameleon hash is created from the source file segments and the auxiliary data.

At block 512, a cryptographic hash is created from the auxiliary data.

At block 514, signatures resulting from the chameleon hash and the cryptographic hash are stored to a shared ledger of the blockchain.

Figure 5B:
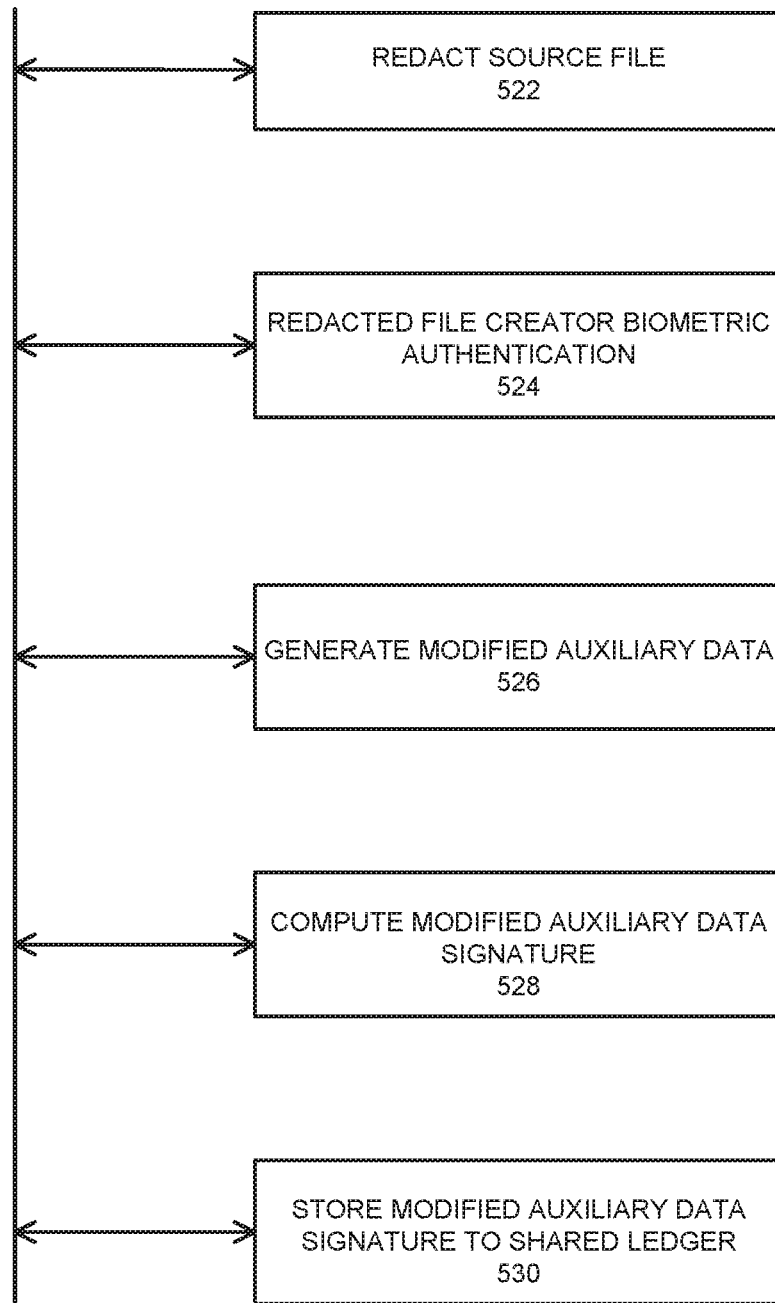
FIG. 5B illustrates a flow diagram of an example method of creating a redacted source file signature in a blockchain, according to example embodiments.

FIG. 5B illustrates a flow diagram 520 of an example method of creating a redacted source file signature in a blockchain, according to example embodiments. Referring to FIG. 5B, the method 520 may include one or more of the following steps.

At block 522, a redacted file creator 450 creates a redacted source file, which removes or modifies one or more portions of the source file. The redacted source file may include text, video, audio, and/or graphics.

At block 524, the redacted file creator 450 is biometrically authenticated, and the authentications are stored to the blockchain.

At block 526, modified auxiliary data based on the redacted source file is generated.

At block 528, a modified auxiliary data signature is computed that corresponds to the modified auxiliary data.

At block 530, the modified auxiliary data signature is stored to a shared ledger of the blockchain.

Figure 5C:
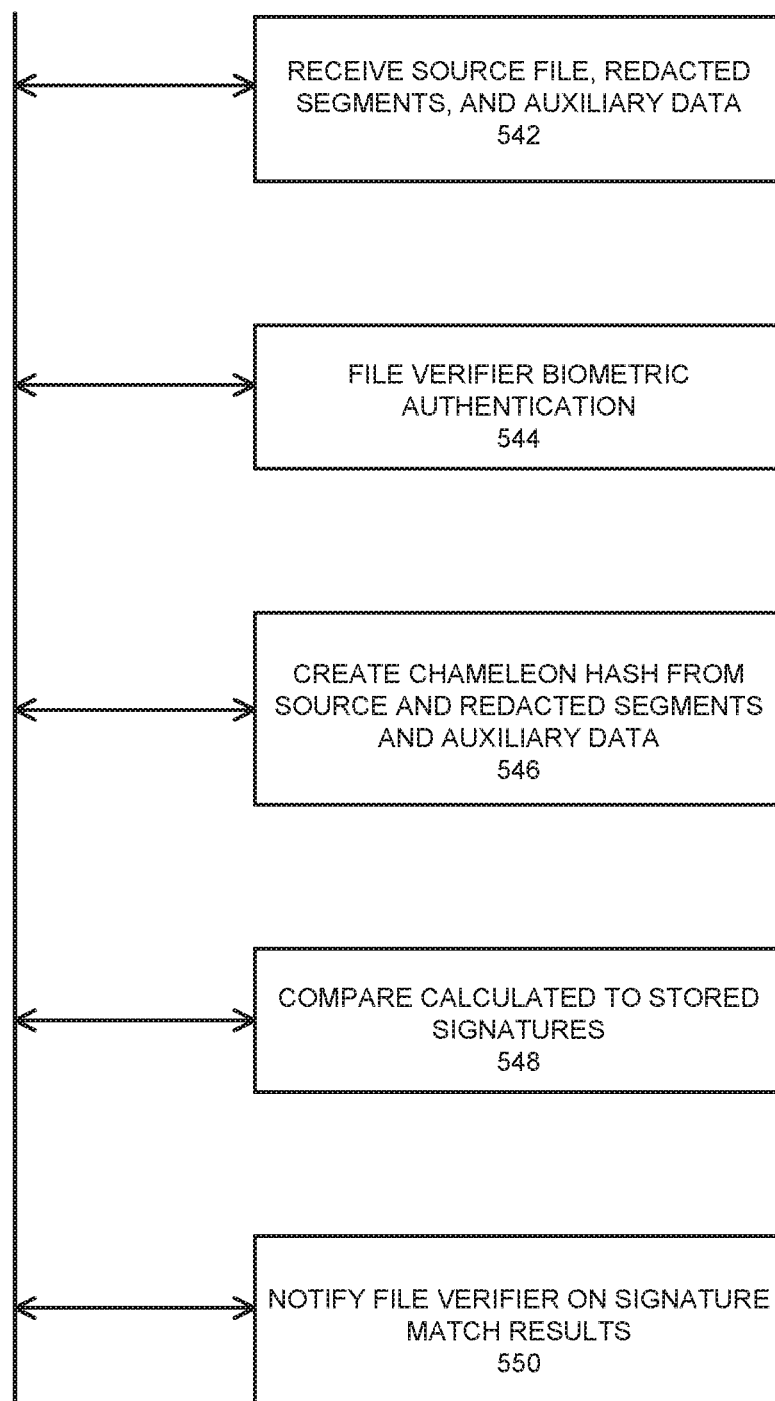
FIG. 5C illustrates a flow diagram of an example method of verifying source and redacted file signatures in a blockchain.

FIG. 5C illustrates a flow diagram 540 of an example method of verifying source and redacted file signatures in a blockchain, according to example embodiments. Referring to FIG. 5C, the method 540 may include one or more of the following steps.

At block 542, a file verifier 472 receives a source file, redacted segments of the source file, and auxiliary data. The source file and redacted source file may include text, video, audio, and/or graphics.

At block 544, the file verifier 472 are biometrically authenticated, and the authentications are stored to the blockchain.

At block 546, a chameleon hash is created from either the source file segments or redacted file segments, and the auxiliary data.

At block 548, the file verifier 472 retrieves stored signatures for the source file or redacted source file and compares the retrieved signatures to the calculated source file hash or redacted source file hash.

At block 550, the file verifier 472 is notified if the stored signatures match the calculated signatures (hashes).

Figure 5D:
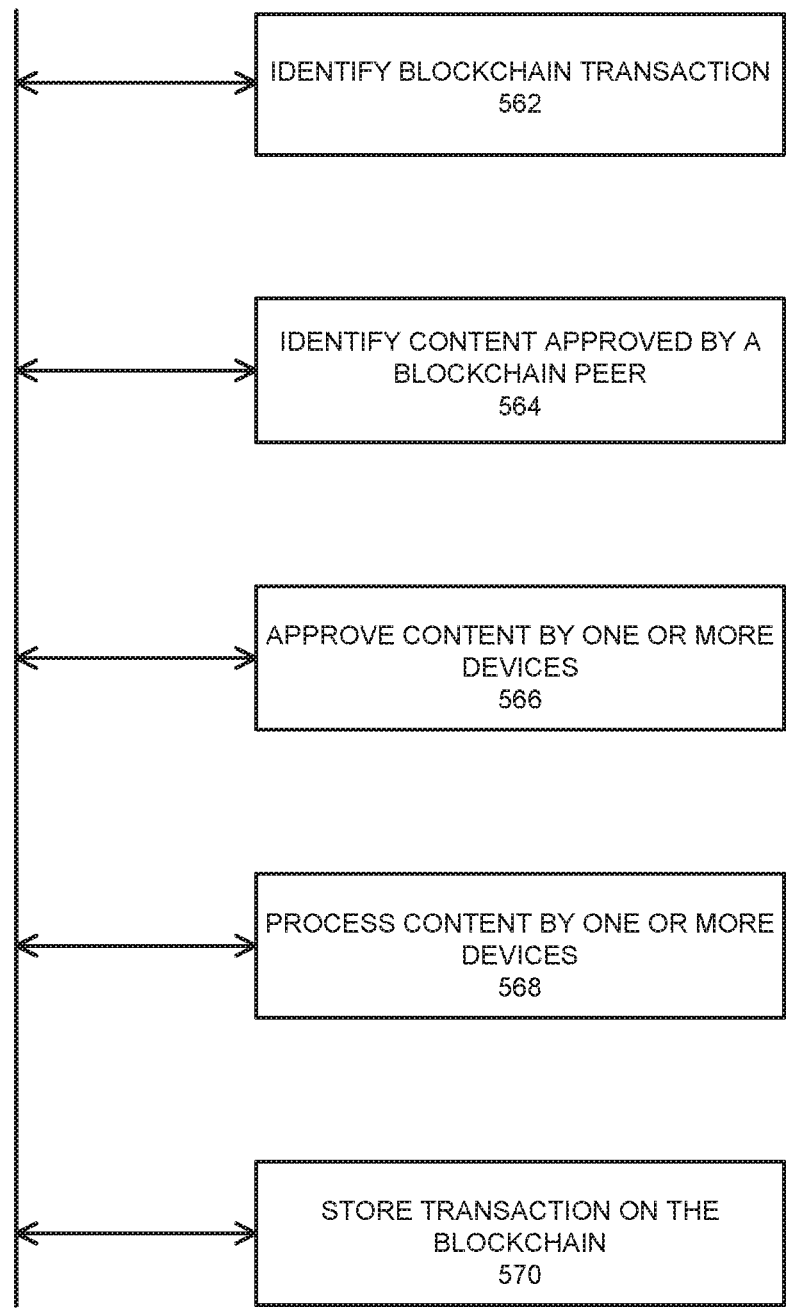
FIG. 5D illustrates a flow diagram of an example method of redacting a document associated with a blockchain transaction, according to example embodiments.

FIG. 5D illustrates a flow diagram 560 of an example method of redacting a document associated with a blockchain transaction, according to example embodiments. Referring to FIG. 5B, the method 560 may include one or more of the following steps.

At block 562, the method may also include identifying a blockchain transaction. The transaction may include content to be redacted. When redacting a transaction, the data that was originally identified in the transaction may be hidden or blocked from view in the actual committed blockchain transaction. For example, once a transaction is identified as requiring redaction, the transaction may still exist in a block to preserve immutability of that transaction, however, the transaction may be otherwise inaccessible and cannot be accessed or viewed by users. For example, one approach may include placing a contract in a genesis block of the blockchain with code indicating to record redacted transactions. Additionally, by sending a new transaction to the redaction contract identifying a particular blockchain transaction to be redacted, the new transaction may be recorded and a redaction procedure may identify the "improper transaction" as the transaction to be redacted on the blockchain.

At block 564, the method includes pre-processing the blockchain transaction to identify whether content of the blockchain transaction is approved by one or more devices on a peer network associated with the blockchain.

At block 566, the method includes approving content by one or more devices. If a transaction contains unexpected content, the pre-processing will identify this content and it will not be finalized or stored in the blockchain. As such, miner devices have their own filter for approving content (or not) and a consensus may be reached regarding the acceptance of content of a transaction.

At block 568, the method includes processing the identified content by the one or more devices, in response to approving the content by the one or more devices.

At block 570, the method includes storing the blockchain transaction on the blockchain. In this example, a pre-processing operation confirms the content of the transaction is recognizable or expected by potential miner devices on the peer network prior to committing a transaction that should not be permitted.

Figure 6A:
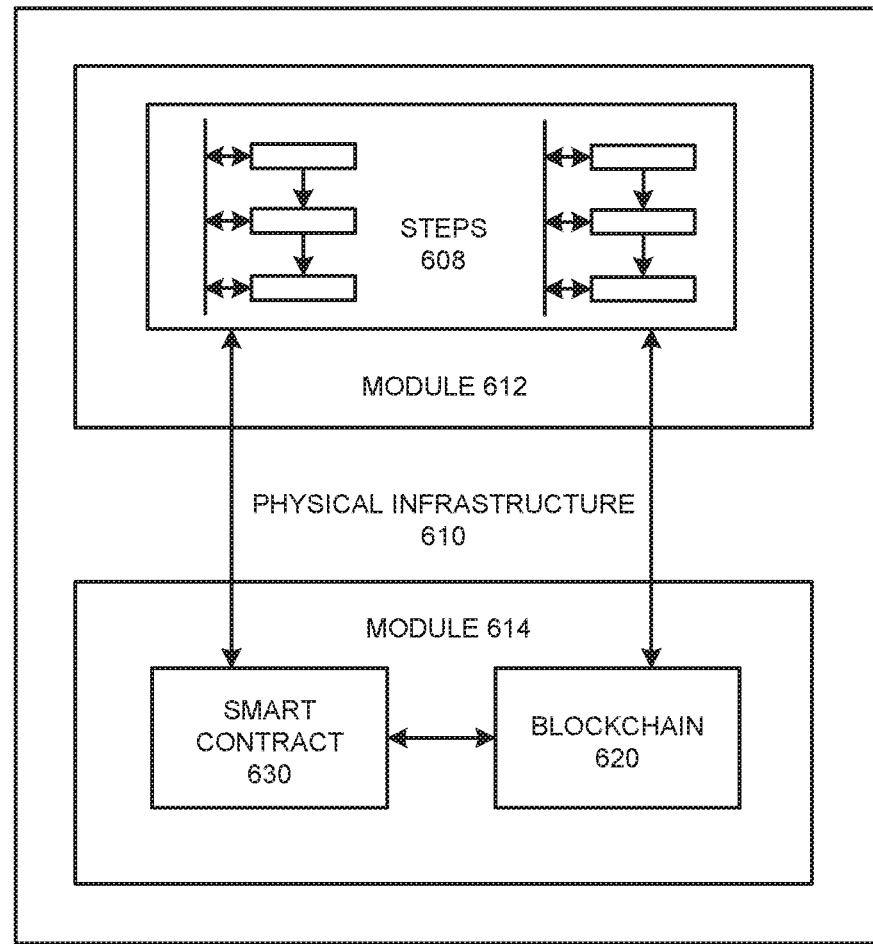
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
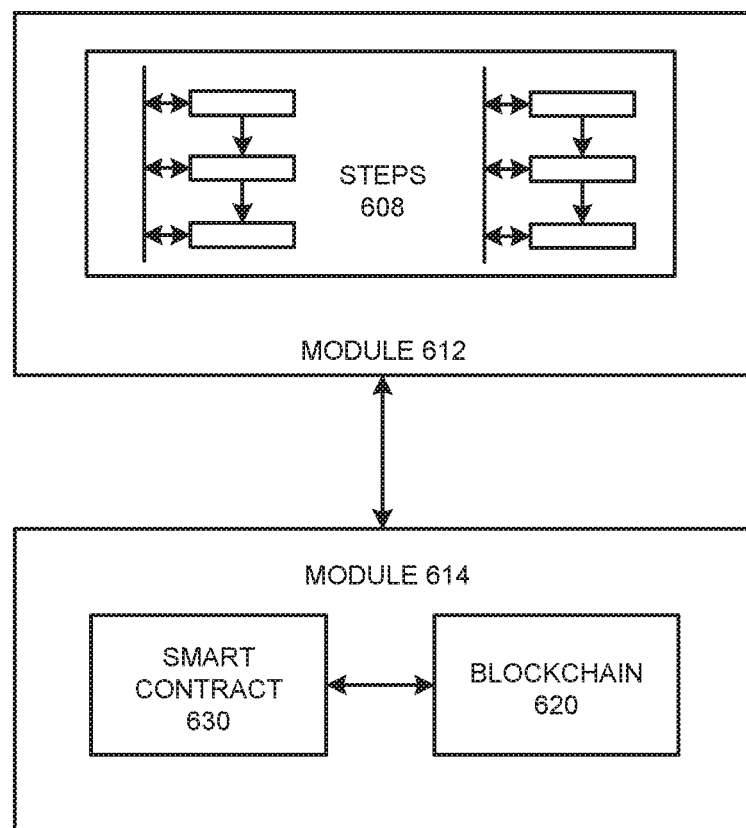
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
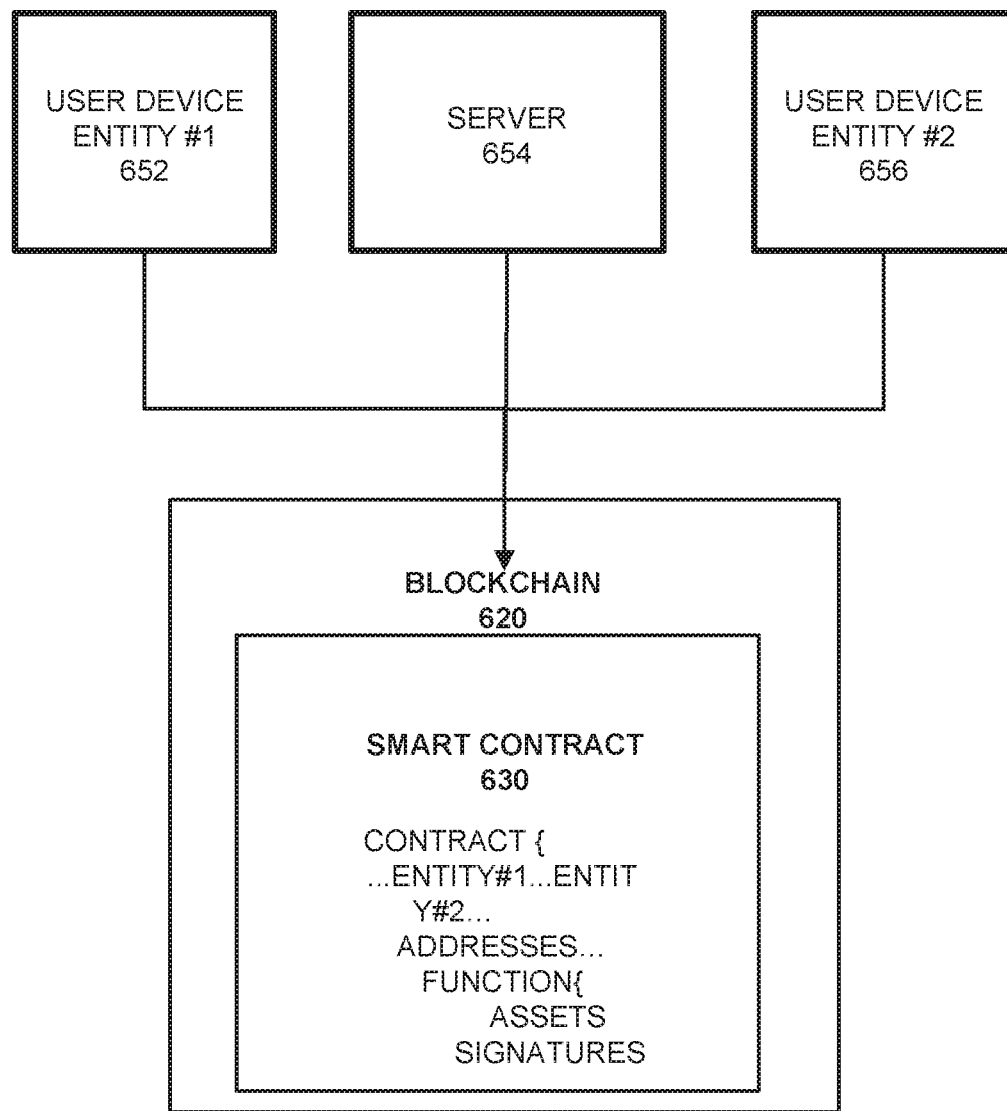
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
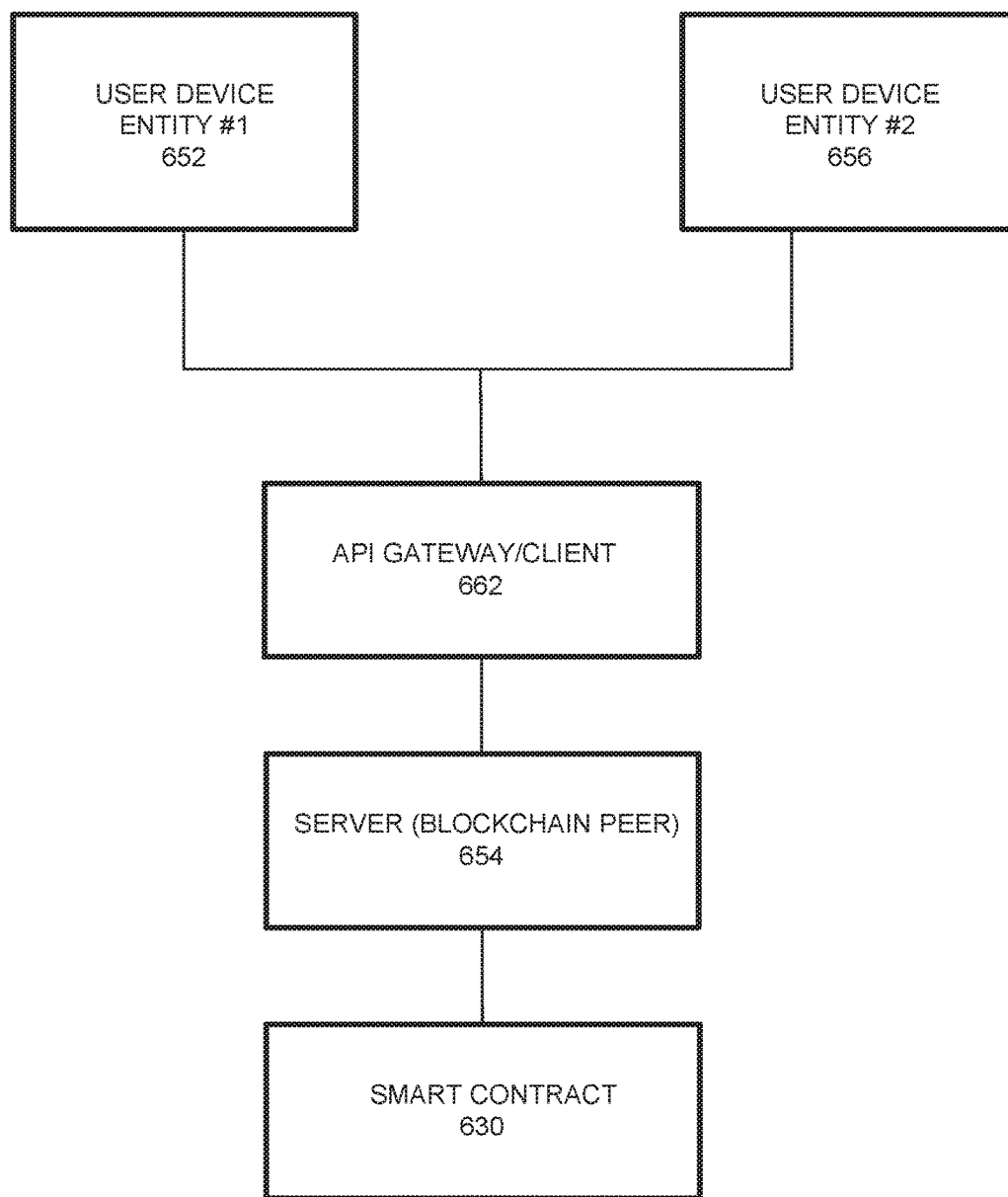
FIG. 6D illustrates an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
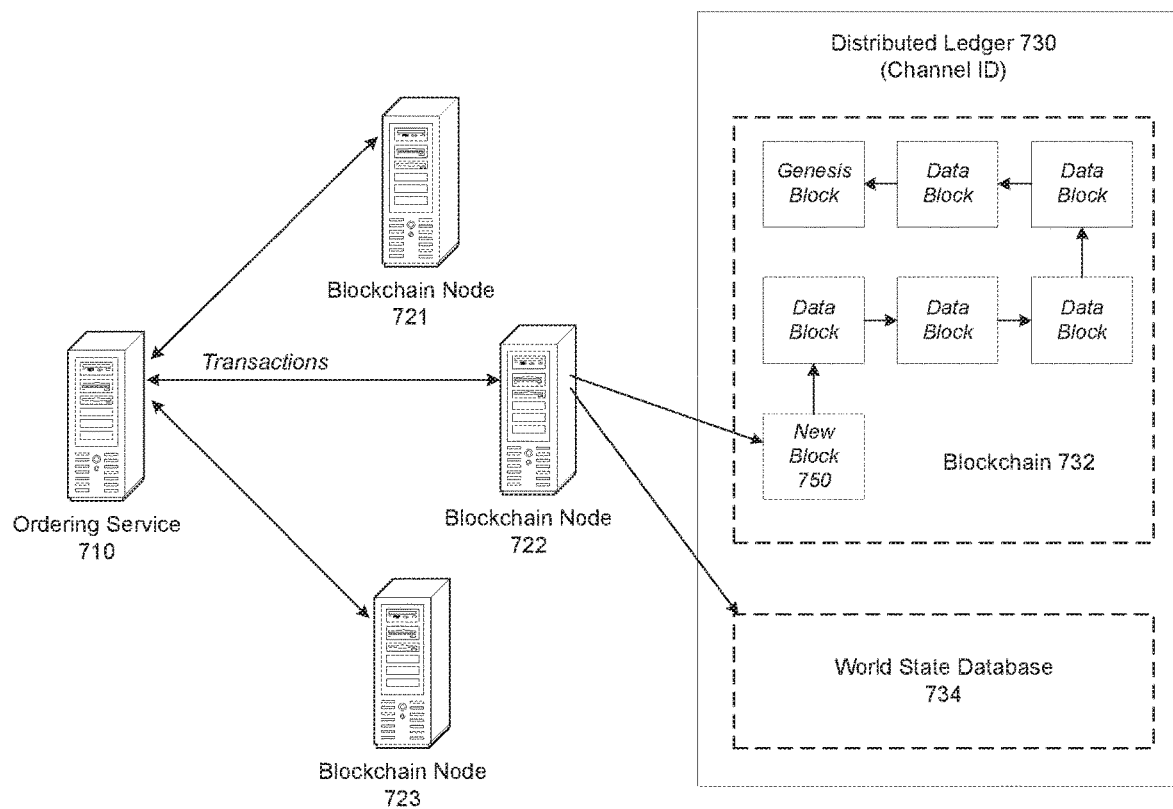
FIG. 7A illustrates a process of new data being added to a database, according to example embodiments.
Figure 7B:
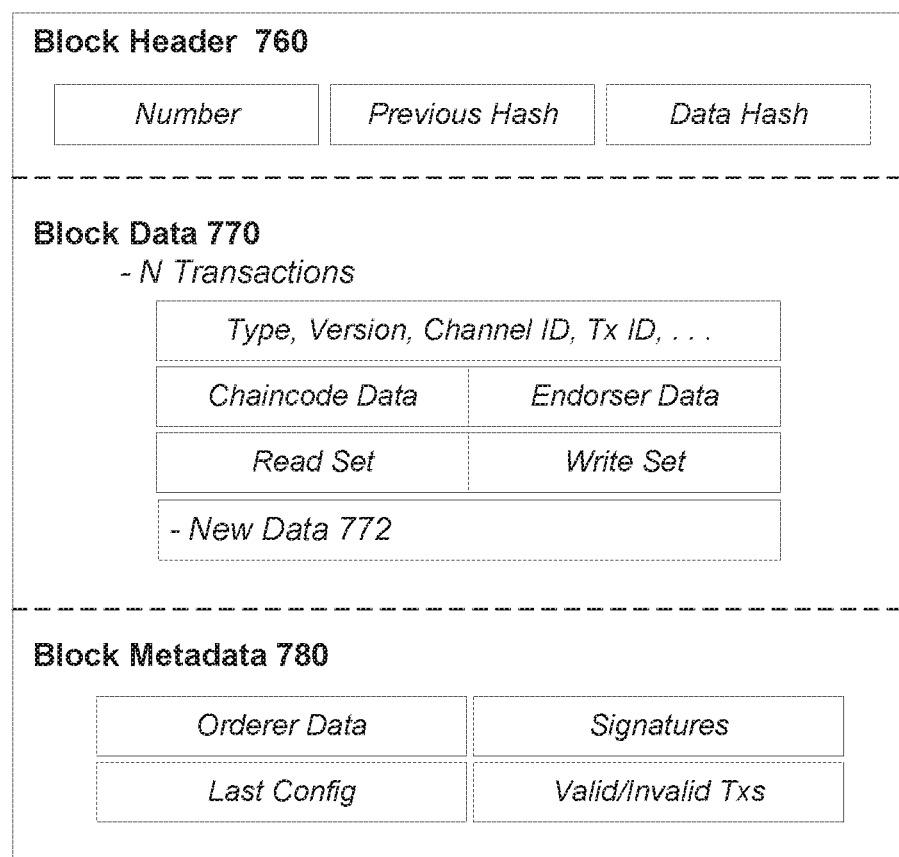
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, a user device biometric authentication, a file creator biometric authentication, a source file signature, an auxiliary data signature, a timestamp associated with a source file, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
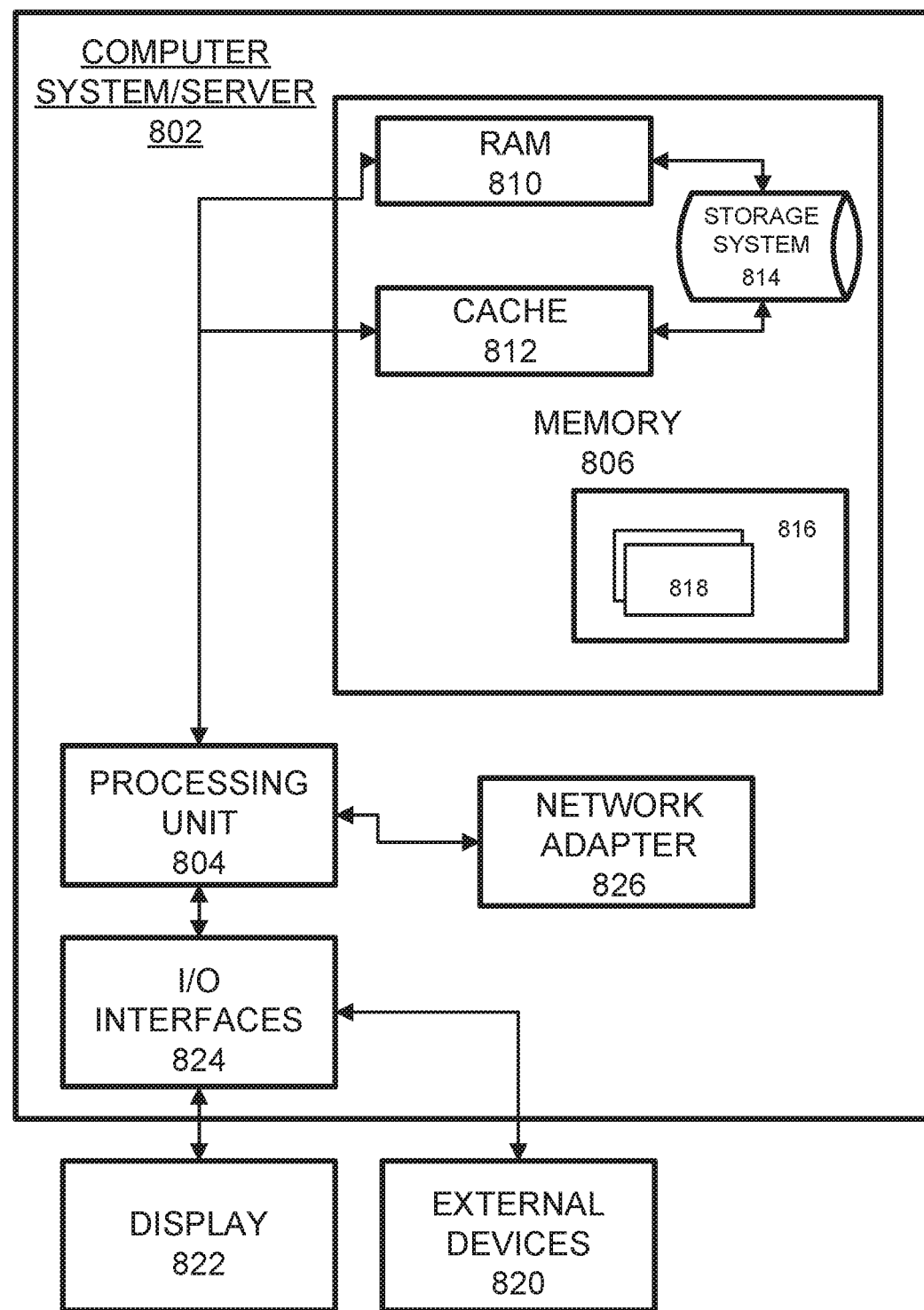
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. A system, comprising:
   a blockchain network comprising a shared ledger which stores a source file signature that is created by inputting a plurality of segments of a source file paired with a plurality auxiliary data segments, respectively, into a first Merkle tree of a chameleon hash function;
   a file redaction device configured to redact a source file segment from among the plurality of segments of the source file;

a signature update device configured to:
- receive the redacted source file segment and the plurality of auxiliary data segments paired with the plurality of segments of the source file in the chameleon hash function;
- modify an auxiliary data segment that is paired with the redacted source file segment;
- input the plurality of auxiliary data segments including the modified auxiliary data segment into a second Merkle tree of a cryptographic hash function which outputs a modified auxiliary data signature; and
- store the modified auxiliary data signature to the shared ledger.

2. The system of claim 1, wherein the file redaction device is further configured to perform biometric authentication on a user who redacted the source file segment.

3. The system of claim 2, wherein the file redaction device is further configured to:
- determine the user who redacted the source file segment has an approved identity; and
- create an authentication blockchain transaction, the authentication transaction comprising biometric authentications of the user who redacted the source file segment;
- wherein the blockchain network is configured to:
- endorse the authentication transaction; and
- store the authentication transaction to the shared ledger.

4. The system of claim 1, wherein the plurality of auxiliary data segments are stored outside the blockchain network.

5. The system of claim 1, wherein the source file signature previously stored to the shared ledger does not change in response to the modified auxiliary data signature and the source file signature corresponds to original source file content prior to redaction.

6. The system of claim 1, wherein the signature update device is configured to input the plurality of auxiliary data segments including the modified auxiliary data segment into leaf nodes of the second Merkle tree.

7. The system of claim 1, wherein the signature update device is further configured to:
- create a blockchain transaction comprising the modified auxiliary data signature and an identifier of the redacted source file segment;
- wherein the blockchain network is further configured to endorse the blockchain transaction.

8. A method, comprising:
- storing a source file signature that is created by inputting a plurality of segments of a source file paired with a plurality auxiliary data segments, respectively, into a first Merkle tree of a chameleon hash function;
- redacting, by a file redaction device, a source file segment from among the plurality of segments of the source file;
- receiving, by a signature update device, the redacted source file segment and the plurality of auxiliary data segments paired with the plurality of source file segments in the chameleon hash function;
- modifying an auxiliary data segment that is paired with the redacted source file segment;
- inputting the plurality of auxiliary data segments including the modified auxiliary data segment into a second Merkle tree of a cryptographic hash function which outputs a modified auxiliary data signature; and
- storing the modified auxiliary data signature to a shared ledger of a blockchain network.

9. The method of claim 8, wherein the method further comprises:
- performing, by the file redaction device, biometric authentication on a user who redacted the source file segment.

10. The method of claim 9, wherein the method further comprises:
- determining the user who redacted the source file segment has an approved identity; and
- creating an authentication blockchain transaction, the authentication transaction comprising biometric authentications of the user who redacted the source file segment;
- wherein the method further comprises:
- endorsing the authentication transaction; and
- storing the authentication transaction to the shared ledger.

11. The method of claim 8, wherein the plurality of auxiliary data segments are stored outside the blockchain network.

12. The method of claim 8, wherein the source file signature previously stored to the shared ledger does not change in response to the modified auxiliary data signature and the source file signature corresponds to original source file content prior to redaction.

13. The method of claim 8, wherein the inputting comprises inputting the plurality of auxiliary data segments including the modified auxiliary data segment into leaf nodes of the second Merkle tree.

14. The method of claim 8, wherein the storing comprises:
- creating a blockchain transaction comprising the modified auxiliary data signature and an identifier of the redacted source file segment; and
- endorsing the blockchain transaction.

15. A non-transitory computer readable medium comprising instructions, that when read by a processor, cause the processor to perform a method comprising:
- storing a source file signature that is created by inputting a plurality of segments of a source file paired with a plurality auxiliary data segments, respectively, into a first Merkle tree of a chameleon hash function;
- redacting, by a file redaction device, a source file segment from among the plurality of segments of the source file;
- receiving, by a signature update device the redacted source file segment and the plurality of auxiliary data segments paired with the plurality of source file segments in the chameleon hash function;
- modifying an auxiliary data segment that is paired with the redacted source file segment;
- inputting the plurality of auxiliary data segments including the modified auxiliary data segment into a second Merkle tree of a cryptographic hash function which outputs a modified auxiliary data signature; and
- storing the modified auxiliary data signature to a shared ledger of a blockchain network.

16. The non-transitory computer readable medium of claim 15, wherein the method further comprises:
- determining a user who redacted the source file segment has an approved identity; and
- creating an authentication blockchain transaction, the authentication transaction comprising a biometric authentication of the user who redacted the source file segment;
- wherein the method further comprises:
- endorsing the authentication transaction; and
- storing the authentication transaction to the shared ledger.

17. The non-transitory computer readable medium of claim 15, wherein the plurality of auxiliary data segments are stored outside the blockchain network.

18. The non-transitory computer readable medium of claim 15, wherein the source file signature previously stored to the shared ledger does not change in response to the modified auxiliary data signature and the source file signature corresponds to original source file content prior to redaction.

19. The non-transitory computer readable medium of claim 15, wherein the inputting comprises inputting the plurality of auxiliary data segments including the modified auxiliary data segment into leaf nodes of the second Merkle tree.

20. The non-transitory computer readable medium of claim 15, wherein the storing comprises:
- creating a blockchain transaction comprising the modified auxiliary data signature and an identifier of the redacted source file segment; and
- endorsing the blockchain transaction.

* * * * *